United States Patent
Wu

(10) Patent No.: US 7,437,703 B2
(45) Date of Patent: Oct. 14, 2008

(54) ENTERPRISE MULTI-AGENT SOFTWARE SYSTEM WITH SERVICES ABLE TO CALL MULTIPLE ENGINES AND SCHEDULING CAPABILITY

(75) Inventor: Yuh-Cherng Wu, San Jose, CA (US)

(73) Assignee: SAP AG, Walldorf (DE)

( * ) Notice: Subject to any disclaimer, the term of this patent is extended or adjusted under 35 U.S.C. 154(b) by 1006 days.

(21) Appl. No.: 10/631,664

(22) Filed: Jul. 31, 2003

(65) Prior Publication Data
US 2004/0139426 A1  Jul. 15, 2004

Related U.S. Application Data

(60) Provisional application No. 60/421,650, filed on Oct. 25, 2002.

(51) Int. Cl.
*G06F 9/44* (2006.01)
(52) U.S. Cl. ............ 717/100; 706/45; 706/60; 706/16
(58) Field of Classification Search ........... 717/100; 706/49, 45, 60, 54, 15, 14, 926
See application file for complete search history.

(56) References Cited

U.S. PATENT DOCUMENTS

| | | | |
|---|---|---|---|
| 4,930,071 A | 5/1990 | Tou et al. | |
| 5,233,513 A | 8/1993 | Doyle | |
| 5,386,498 A | 1/1995 | Kakefuda | |
| 5,487,135 A | 1/1996 | Freeman | |
| 5,765,033 A | 6/1998 | Miloslavsky | |
| 5,805,775 A * | 9/1998 | Eberman et al. | 706/11 |
| 5,809,499 A | 9/1998 | Wong et al. | |
| 5,924,090 A | 7/1999 | Krellenstein | |
| 5,963,447 A * | 10/1999 | Kohn et al. | 700/49 |
| 5,978,594 A | 11/1999 | Bonnell et al. | |
| 6,023,692 A * | 2/2000 | Nichols | 706/14 |
| 6,026,386 A * | 2/2000 | Lannert et al. | 706/45 |
| 6,073,127 A * | 6/2000 | Lannert et al. | 706/45 |
| 6,081,798 A * | 6/2000 | Johnson et al. | 706/54 |

(Continued)

FOREIGN PATENT DOCUMENTS

EP  1209617  5/2002

(Continued)

OTHER PUBLICATIONS

Code Complete, Steve McConnell, Chapter 6, Oct. 4, 1993.*

(Continued)

*Primary Examiner*—Todd Ingberg
(74) *Attorney, Agent, or Firm*—Fish & Richardson P.C.

(57) ABSTRACT

A system and techniques are disclosed to provide a multi-agent software environment. The system provides several service modules that may be used by software programs to accomplish specific tasks. In one illustrative example, a first program module includes instructions to call core service software modules. The exemplary system further includes a second program module including instructions to call one of multiple intelligent service software modules. In some examples, an intelligent service software module includes program instructions that when executed perform an intelligent service function that includes execution of an intelligent engine. In some examples, the intelligent engine is callable by at least two of the intelligent service software modules.

31 Claims, 18 Drawing Sheets

U.S. PATENT DOCUMENTS

| | | | |
|---|---|---|---|
| 6,085,187 A | | 7/2000 | Carter et al. |
| 6,088,689 A | * | 7/2000 | Kohn et al. .................... 706/10 |
| 6,101,489 A | * | 8/2000 | Lannert et al. ................ 706/45 |
| 6,125,358 A | * | 9/2000 | Hubbell et al. ................ 706/11 |
| 6,134,539 A | * | 10/2000 | O'Connor et al. ............. 706/45 |
| 6,226,792 B1 | | 5/2001 | Goiffon et al. |
| 6,236,987 B1 | | 5/2001 | Horowitz et al. |
| 6,256,679 B1 | * | 7/2001 | Rhoads et al. .............. 719/315 |
| 6,292,792 B1 | | 9/2001 | Baffes et al. |
| 6,427,063 B1 | * | 7/2002 | Cook et al. ................. 434/350 |
| 6,470,227 B1 | | 10/2002 | Rangachari et al. |
| 6,490,577 B1 | | 12/2002 | Anwar |
| 6,526,387 B1 | | 2/2003 | Ruffin et al. |
| 6,535,861 B1 | * | 3/2003 | O'Connor et al. ............. 706/11 |
| 6,536,935 B2 | * | 3/2003 | Parunak et al. ................ 700/99 |
| 6,542,880 B2 | * | 4/2003 | Rosenfeld et al. ............. 706/45 |
| 6,549,893 B1 | * | 4/2003 | Lannert et al. ................ 706/60 |
| 6,574,621 B1 | | 6/2003 | Lautzenheiser et al. |
| 6,601,233 B1 | * | 7/2003 | Underwood ................ 717/102 |
| 6,606,479 B2 | * | 8/2003 | Cook et al. ................. 434/350 |
| 6,766,368 B1 | | 7/2004 | Jakobson et al. |
| 6,782,374 B2 | * | 8/2004 | Nichols ........................ 706/45 |
| 6,782,391 B1 | * | 8/2004 | Scher .......................... 707/102 |
| 6,789,252 B1 | * | 9/2004 | Burke et al. ................ 717/100 |
| 6,915,285 B2 | * | 7/2005 | Gray et al. ..................... 706/49 |
| 6,957,205 B1 | * | 10/2005 | Liongosari .................... 706/45 |
| 6,983,266 B1 | * | 1/2006 | Goldschmidt ................ 706/52 |
| 7,099,854 B2 | * | 8/2006 | Liongosari ................... 706/45 |
| 2002/0107842 A1 | | 8/2002 | Biebesheimer et al. |
| 2002/0161736 A1 | | 10/2002 | Beygelzimer et al. |
| 2004/0122799 A1 | | 6/2004 | Goyal et al. |

FOREIGN PATENT DOCUMENTS

| | | |
|---|---|---|
| EP | 1209617 A2 * | 5/2002 |
| JP | 2000/231520 | 8/2000 |
| JP | 2001/297261 | 10/2001 |
| WO | 01/42880 A2 | 6/2001 |
| WO | 01/67225 A2 | 9/2001 |

OTHER PUBLICATIONS

Gamma, et al. "Praise for Design Patterns: Elements of Reusable Object-Oriented Software", *Addison-Wesley*, Sep. 1999.

Islam, et al. "An Essential Design Pattern for Fault-Tolerant Distributed State Sharing", *Communications of the ACM*, Oct. 1996, vol. 39, No. 10, pp. 65-74.

Clifton, C. et al, "TopCat: Data Mining Topic Identification in a Text Corpus," Mar. 15, 2000, pp. 1-33, XP002296783.

Cooper, J. W. et al, "Lexical Navigation: Visually Prompted Query Expansion and Refinement," 1997, pp. 237-246, XP002265696.

Lin, S-H. et al, "Extracting Classification Knowledge of Internet Documents with Mining Term Associations: A Semantic Approach," Proceedings of the 21st Annual International ACM-SIGIR Conference on Research and Development in Information Retrieval, Melbourne, Aug. 1998, pp. 241-249, XP000825364.

Munroe, K. D. et al, "BBQ: A Visual Interface for Integrated Browsing and Querying of XML," Proceedings of the IFIP Working Conference on Visual Database Systems, May, 2000, 15 pages, XP002167785.

Staab, S. et al, "Semantic Community Web Portals," Computer Networks, vol. 33, No. 1-6, Jun. 2000, pp. 473-491, XP004304786.

Bartlett et al. "Learning Changing Concepts By Exploiting The Structure of Change," *Machine Learning*, 41 (2000) 153-174.

F.M.T. Brazier et at. "Distributed Scheduling to Support a Call Center: A Cooperative Multiagent Approach," *Applied Artificial Intelligence*, 13 (1999) 65-90.

T. Bui et al. "An Agent-Based Framework For Building Decision Support Systems," *Decision Support Systems*, 25 (1999) 225-237.

S. Castano et al. "Global Viewing Of Heterogeneous Data Sources," *IEEE Trans. On Knowledge And Data Engineerig*, 13 (2001) 277-297.

S.W.K. Chan "Integrating Linguistic Primitives in Learning Context0deoendent Representation," *IEEE Trans on Knowledge and Data Engineering*, 13 (2001) 157-175.

Chang et al. "Enabling Concept-Based Relevance Feedback For Information Retrieval On The WWW," *IEEE Trans. On Knowledge And Data Engineering*, 11 (1999) 595-605.

Ferber, "Multi-Agent Systems: An Introduction to Distributed Artificial Intelligence," *Addison-Wesley*, 1999, pp. 87-142.

Feber, "Multi-Agent Systems: An Introduction to Distributed Artificial Intelligence," *Addison-Wesley,* 1999, pp. 341-398.

M. Mandviwalla et al. "Collaborative Object Workspaces (COWS): Exploring The Integration of Collaboration Technology," *Design Support Systems*, 27 (1999) 241-254.

R. Sikora et al. "A Multi-Agent Framework For The Coordination And Integration Of Information Systems," *Management Science*, 44 (1998) S65-S78.

Weiss, "Multi-Agent Systems: A Modern Approach To Distributed Artificial Intelligence," *The MIT Press*, 2000, pp. 121-164.

Weiss, "Multi-Agent Systems: A Modern Approach To Distributed Artificial Intelligence," *The MIT Press*, 2000, pp. 259-298.

Lesser et al., "BIG: An Agent for Resource-Bounded Information Gathering and Decision Making," *Artificial Intelligence*, 118 (2000) 197-244.

* cited by examiner

ENTERPRISE MULTI-AGENT SOFTWARE SYSTEM WITH SERVICES ABLE TO CALL MULTIPLE ENGINES AND SCHEDULING CAPABILITY

CROSS-REFERENCE TO RELATED APPLICATIONS

This application claims the benefit of U.S. Provisional Patent Application Ser. No. 60/421,650, filed on Oct. 25, 2002.

TECHNICAL FIELD

This disclosure relates to an enterprise multi-agent software system.

BACKGROUND

Generally, an enterprise multi-agent software system is used to denote a particular arrangement of data structures, algorithms, and control flows, which agent/systems (e.g. computer programs) use to decide what task to execute. Agent systems may be characterized by the nature of their decision-making. Example types of software agent systems include logical-based systems in which decision making is achieved via logical deduction, reactive systems in which decision making is achieved via a mapping from perception to action, belief-desire-intention systems in which decision making is viewed as practical reasoning of the type that we perform every day in furtherance of our goals, and layered multi-agent systems in which decision making is realized via the interaction of a number of task accomplishing software layers.

SUMMARY

A computer system and techniques are disclosed to provide a multi-agent software environment. The computer system has several service modules (core service modules and intelligent service modules) that may be used by software programs, such as agent systems, to accomplish specific tasks.

For example, according to one aspect, the computer system includes core service software modules, intelligent service modules, and software programs. Each core service software module has program instructions that, when executed, perform core service functions that interact with a data source. Each core service software module also is callable by a software program module, and when called, the called core service software module provides information identifying a core service function to be performed and information identifying a data object upon which the identified core service function is to be performed.

Each intelligent service software module has program instructions that, when executed, perform an intelligent service function that includes the execution of an intelligent engine. Each intelligent service software module also is callable by a software program module, and when called, the called intelligent service software module is provided with information identifying an intelligent service function to be performed and information identifying parameters to be used during the performance of the intelligent service. Each software program, for example an agent system, has a set of program modules including instructions that, when executed, call at least one of the core service and the intelligent service software modules.

In another aspect, the system also includes organization service software modules. Each organization service software module has program instructions that, when executed, perform organization service functions that manage at least one software program module. Each organization service software module also is callable by the software program module, and when called, the called organization service software module is provided with information identifying the organization service function to be performed and information identifying the software program module upon which the identified organization service function is to be performed.

In some embodiments, one or more of the following advantages may be present. For example, multi-agent enterprise systems may play a decision-support role for a help-desk users interacting with customers in a more efficient and effective manner. Software agents may assist the help-desk user to identify problems and match solutions so that even inexperienced help-desk users may deliver the highest quality of service as expert help-desk users.

An additional benefit of the system relates to customer self-service. Software agents deployed in this system may directly interact with customers to provide solutions without human involvement. As a result, the system may reduce help-desk cost, increase the quality of 24-hour service, maintain service consistency via preserved expertise, and assure proper responses via tracking all the customer interactions.

A further benefit of the system relates to proactive awareness. Software agents may play a role to initiate a series of interactions with an application, another software agent, or an end-user to provide a user-oriented service or sell experience.

An additional benefit of the system may relate to knowledge discovery. Software agents may play a computational role to extract knowledge via exploration and identification of useful patterns from customer behavior and user interactions.

Additional features and advantages will be readily apparent from the following descriptions and attachments.

BRIEF DESCRIPTION OF THE DRAWINGS

Like reference symbols in the various drawings indicate like elements.

DETAILED DESCRIPTION

Figure 1:
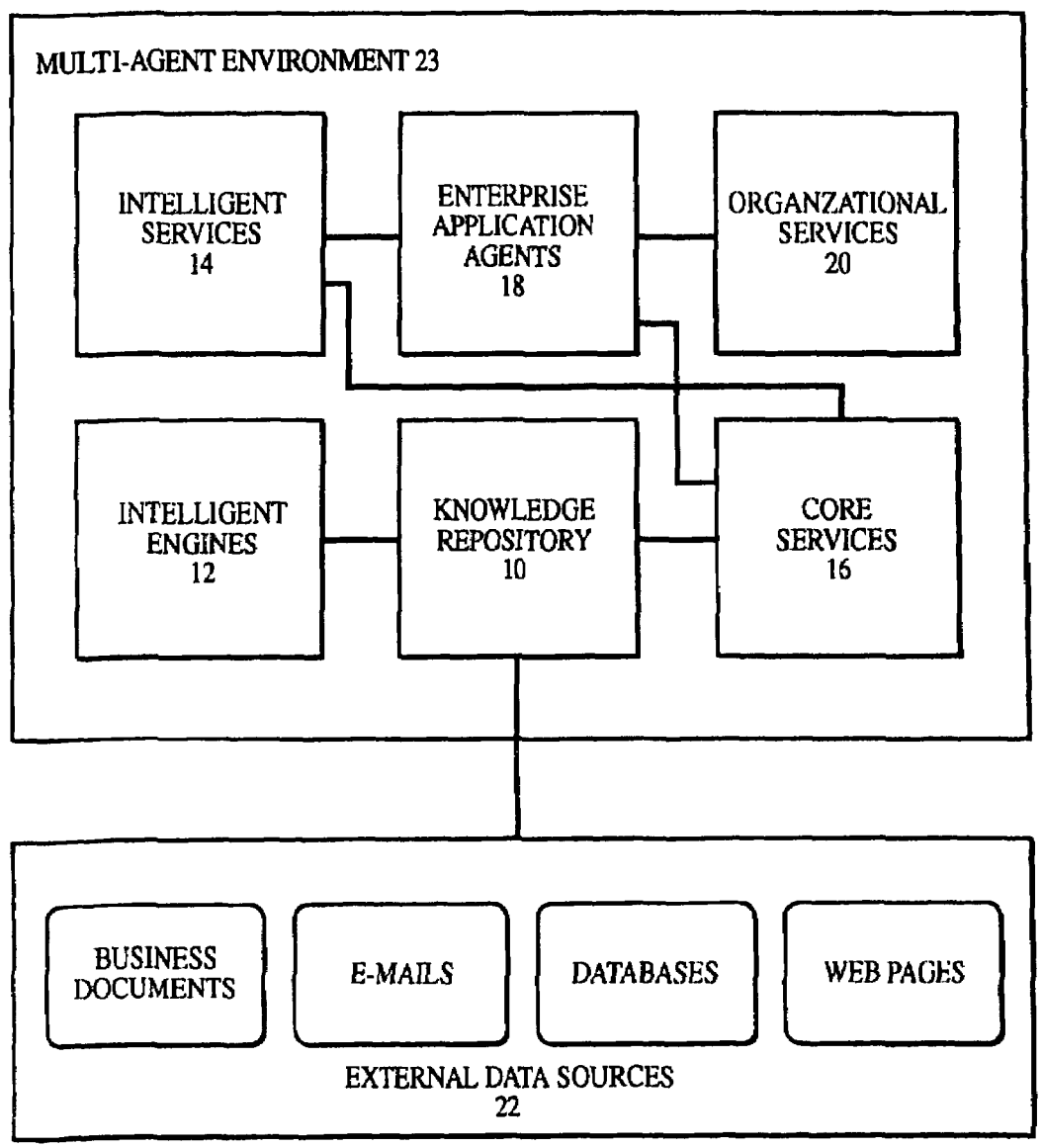
FIG. 1 is a block diagram of a computer-based enterprise multi-agent system.

As shown in FIG. 1, a multi-agent enterprise system is disclosed. The system provides a set of software modules that may be used as building blocks for constructing software agents as well as a set of software modules that support a multi-agent environment.

Referring to FIG. 1, components of the system include a knowledge repository 10, intelligent engines 12, intelligent services 14, enterprise application agents 18, core services 16 and organization services 20.

Figure 2:
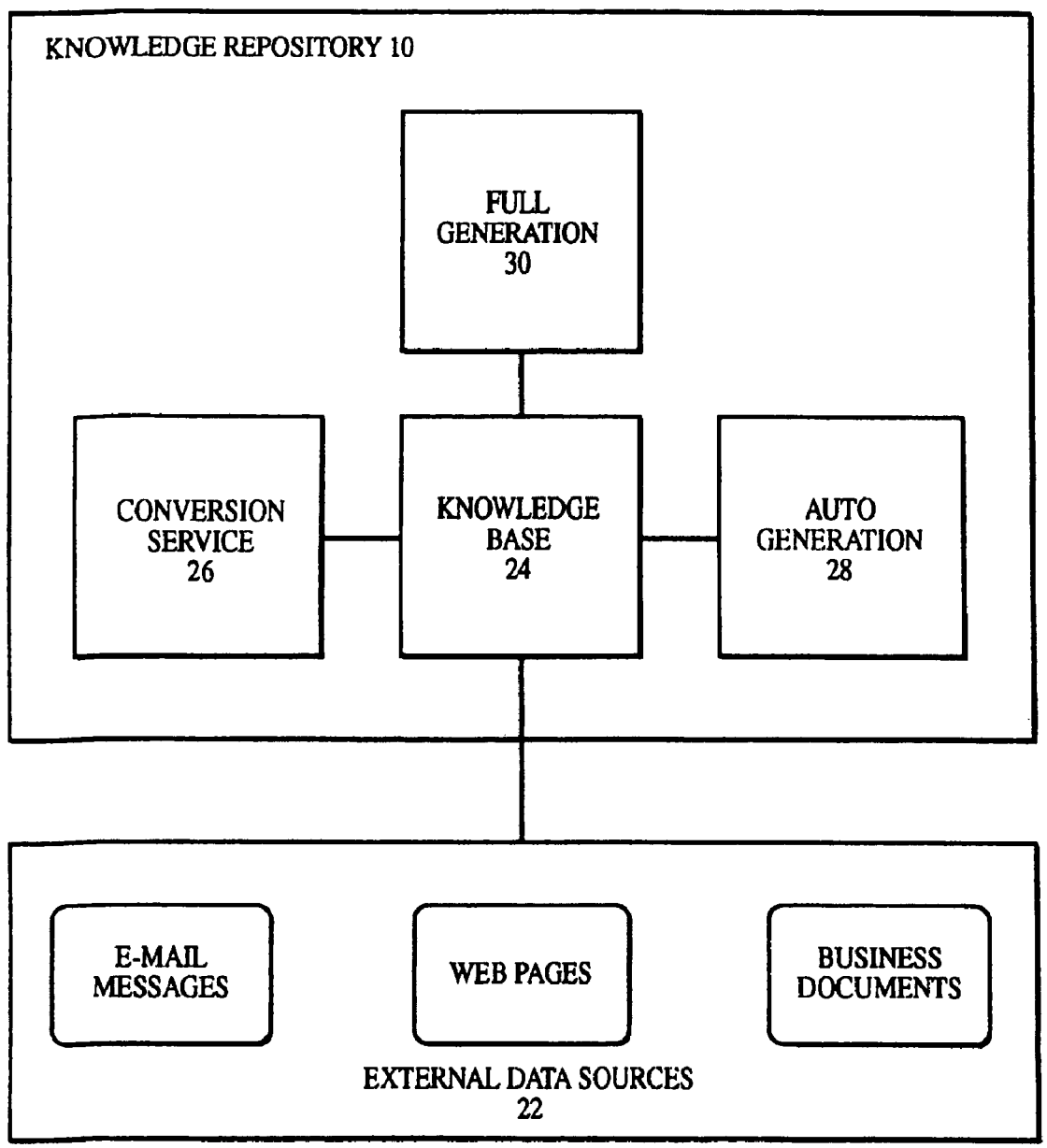
FIG. 2 is a block diagram of the knowledge repository component shown in FIG. 1.

Referring to FIG. 2, knowledge repository 10 provides a generic framework to migrate, synchronize, and aggregate stored knowledge from multiple and distributed data sources for use by enterprise application agents. Stored knowledge may be represented in the system in a knowledge base 24. Knowledge base 24 may be a collection of business entities mapped to business data that are meaningful in business processes. In one embodiment, knowledge base 24 may include data structures that include pointers to collections of documents. For example, pointers may refer to electronic mail (e-mail messages), web pages, and business documents that may be searched and organized by enterprise application agents. The structure of knowledge within knowledge base 24 may be varied from free-form text to hierarchy attributes and include static as well as dynamic structures. Although only a single knowledge base 24 is illustrated in FIG. 2, knowledge repository 10 may be configured to support multiple knowledge bases.

In some embodiments, knowledge repository 10 provides a conversion service 26 that may flexibly manage the structures contained in knowledge base 24. In addition, knowledge repository 10 may provide a full generation process 30 that may manipulate and extend contents of knowledge base 24. For example, in external systems that store new electronic data sources, knowledge base 24 may be extended to incorporate access to such new data by enterprise application agents. Knowledge repository 10 may also provide an auto-generation process 28 that provides zero-maintenance for data synchronization. For example, as external data represented by knowledge base 24 is modified by external means, auto-generation process 28 may automatically modify knowledge representations in knowledge base 24.

One advantage of providing knowledge repository 10 within the system may be that enterprise application agents may process information independent of underlying data source structures. Another advantage of providing knowledge repository 10 may relate to a known and defined interface for application agents. Processes employed by enterprise application agents may be completely encapsulated inside knowledge base components so that enterprise application agents need not interpret underlying data structures.

Referring to FIG. 1, intelligent engines 12 provide software components that allow application agents to integrate technologies developed from artificial intelligence and data-mining. Each intelligent engine 12 may have its own well-defined functionality, operate independently, and process data from knowledge bases stored in knowledge repository 10. Typically, each intelligent engine 12 may have associated with it one or more intelligent services 14.

Figure 3:
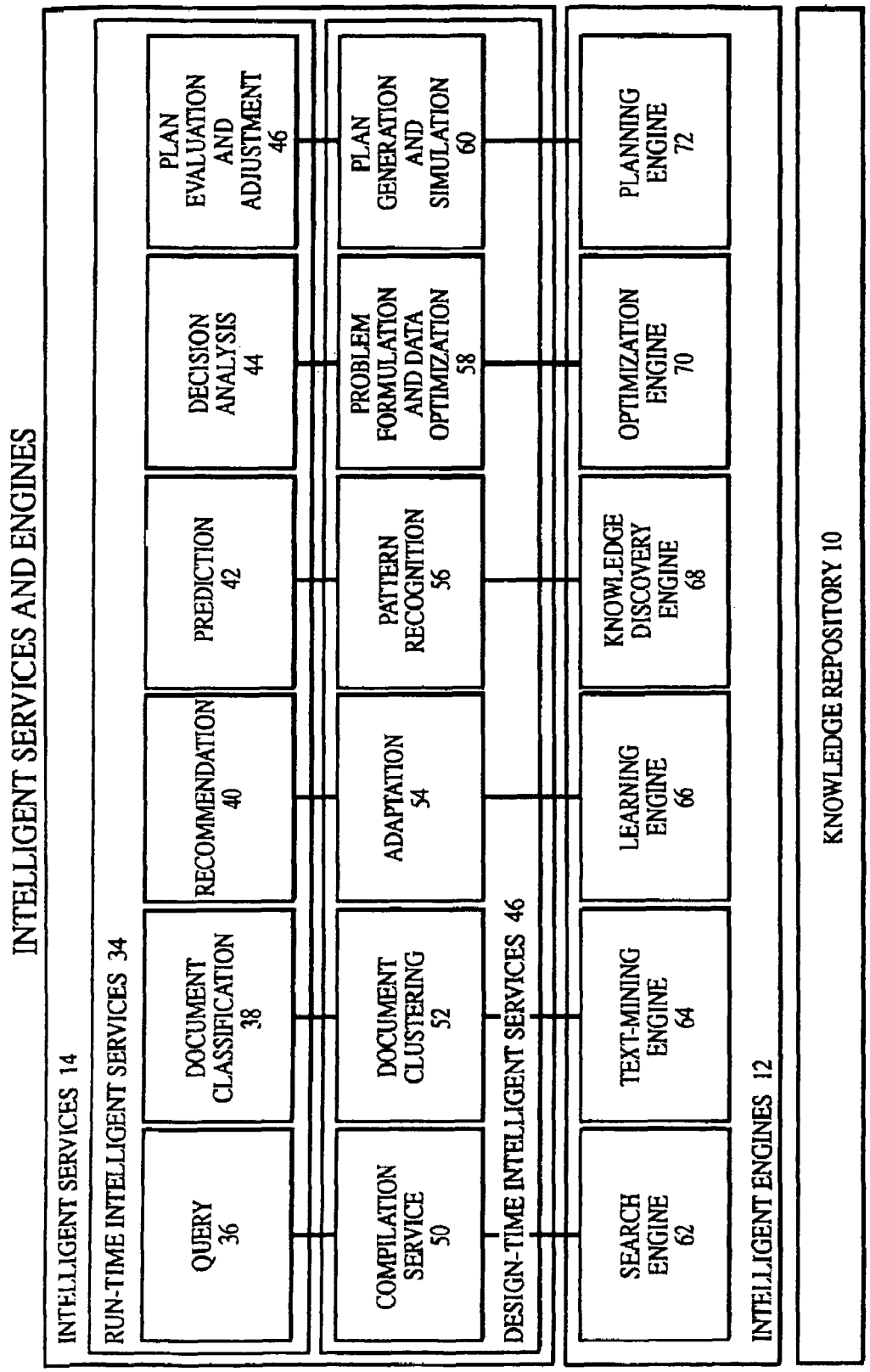
FIG. 3 is a block diagram of the intelligent services and intelligent engines modules shown in FIG. 1.

Referring to FIG. 3, in one embodiment, six different intelligent engines are disclosed. The engines include a search engine 62, text-mining engine 64, learning engine 66, knowledge discovery engine 68, optimization engine 70, and planning engine 72. Although six intelligent engines are illustrated in FIG. 3, the disclosure is not limited to only six.

Search engine 62 is provided which may be used to search the content of particular knowledge bases. Search engine 62 may point to one or more knowledge bases and process search queries using free form texts or structured formats. Search engine 62 may store indexes of terms from a set of documents that may later be retrieved quickly based on term-document relationships.

Search engine 62 may be composed of a free text search interface that performs a query-based free-text search against one or more knowledge bases, an attribute search interface that performs a search by exactly matching a set of attributes, a Boolean operation interface that defines a set of Boolean operations on top of search queries, a case-based search interface that retrieves a set of cases based on computations of similarity, a translated search interface that translates a search query into a different language, an interpreted search interface that interprets a search query based on a pre-defined ontological map which describes the concepts and relationships among a set of terms, a compilation interface that may be used to compile a corpus or index for a specific knowledge base, a search refinement interface that may apply techniques to refine search results, and a search expansion interface that applies a strategy to expand search results. In one embodiment, the SAP TREX search engine may be used as a default search engine. In other embodiments, web-based search engines (e.g., Yahoo, Excite, AltaVista, etc.) may be incorporated into the system to search the World Wide Web.

Text-mining engine 64 is provided which explores and identifies patterns from unstructured texts. For example, a business process may need to cluster documents into multiple classes based on the similarity of document contents, or generate a topic map automatically based on document contents.

Learning engine 66 provides a generic learning interface to learn pre-defined tasks using various machine learning technology. Due to the significant variation in learning methods, learning engine 66 may be designed as a generic wrapper wherein one or more learning algorithms may be developed and implemented separately. For example, learning engine 66 may need to incorporate supervised, unsupervised, case-based, association-based, sequence-based, statistic-based learning algorithms into various business processes.

Knowledge discovery engine 68 is provided to discover patterns from a large amount of data using data-mining technology. The basic interface supported for knowledge discovery engine 68 may include data cleansing, clustering, hierarchical clustering, classification, feature selection (identify variables with predictive power), qualitative modeling (identify structure and relationships among variables, e.g., decision trees, rules, or structures), quantitative modeling (mathematical models), prediction, and sensitive analysis (robustness of models via simulation). In one embodiment, knowledge discovery engine 68 has a special interface extension for time-series analysis that may be processed differently compared to non time-series analysis.

Optimization engine 70 is provided to solve optimization problems with pre-defined object functions and constraints. Solving linear, nonlinear, Boolean, and constraint-based optimization problems may require the use of different algorithms. Optimization engine 70 is designed to work with generic mathematical forms needed to solve such optimization problems. Optimization engine 70 is also designed to interface with external optimization engines.

Planning engine 72 is provided that may, given a set of goals, a set of known information, and resource constraints, search possible plans which are either optimal in a mathematic definition or approximately optimal if no plan may be found to meet all constraints. In one embodiment, planning engine 72 may utilize a stochastic process to simulate the uncertainty of information while evaluating various plans. In other embodiments, the uncertainty of information may be modeled via statistical distributions based on previously collected historical information. The sensitivity of plans may be evaluated and quantified by adjusting distribution parameters.

Intelligent services 14 are provided that interface to one or more intelligence engines as generic components. By interfacing with each intelligent engine as a generic component, intelligent services may modify intelligent engine inputs and parameters such that different results from the same intelligence engine may be achieved. For example, optimization engine 70 may be re-used for decision analysis, problem scheduling, and visualization layouts by manipulating optimization engine 70 parameters. In this example, three intelligent services may be built on top of optimization engine 70 to achieve different tasks that may be applied to different business processes. One advantage of this design may be that enterprise application agents may use different intelligent services that rely upon the same intelligent engine and thus provide additional functionality to solve specific business problems.

In one embodiment, referring to FIG. 3, intelligent services 14 may be structured into two service categories: design-time intelligent services 48 and run-time intelligent services 34. In one embodiment, design-time intelligent services 48 process data in batch mode and provide resultant information for run-time intelligent services. Design-time intelligent services 48 may be triggered automatically by a scheduled batch job using one of the services in core services component 16. Design-time intelligent services 48 include a compilation service 50, clustering service 52, adaptation service 54, pattern recognition service 56, optimization service 58, and a plan generation service 60.

Compilation service 50 provides a generic service that may retrieve contents of a knowledge base 24 defined in knowledge repository 10, convert the content of knowledge base 24 to proper format and create an index into search engine 62. Compilation service 50 also provides an interface to delete an existing search index, compile a full knowledge base, compile delta changes of a knowledge base and schedule batch jobs to automatically execute compilation tasks.

Figure 4:
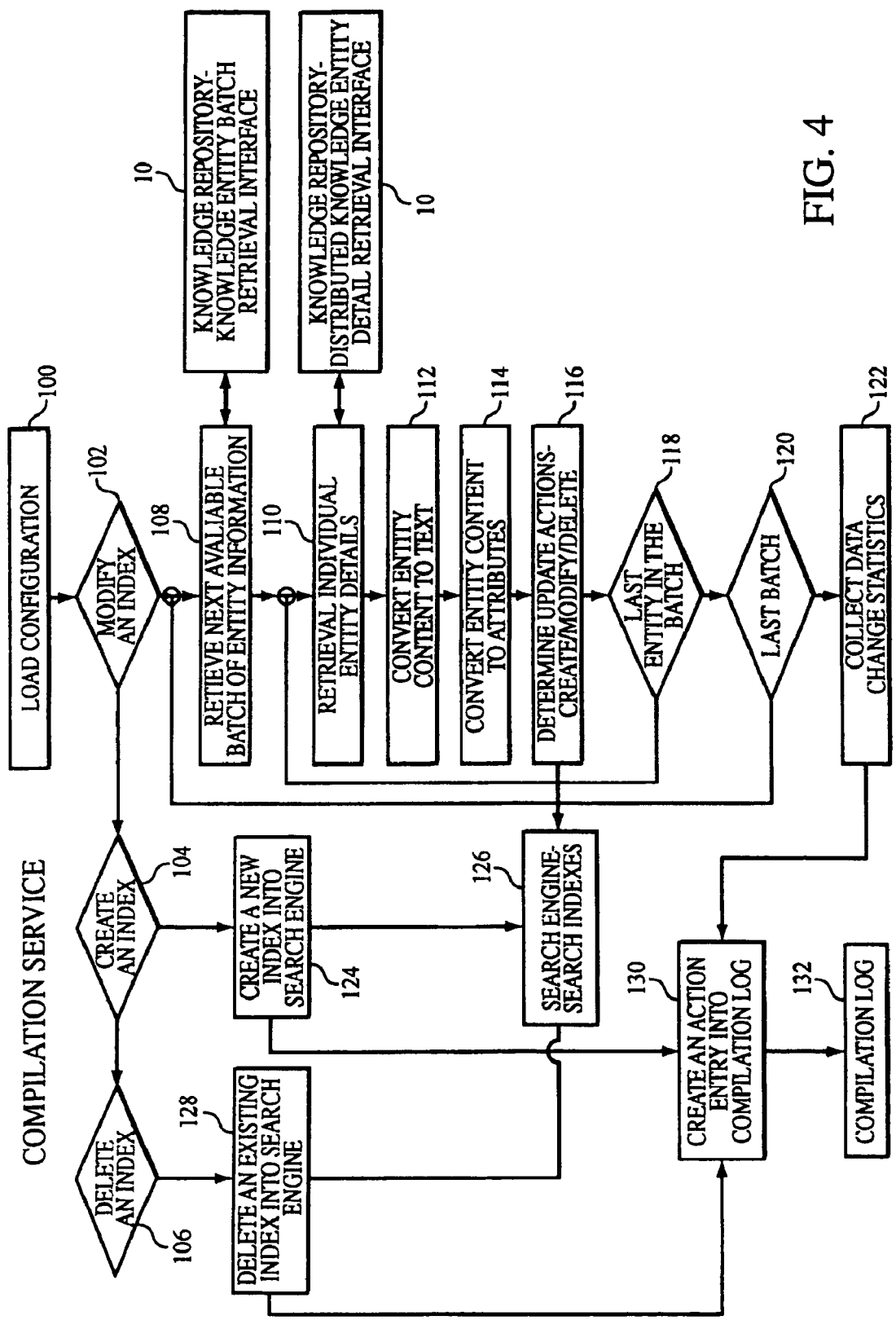
FIG. 4 is a block diagram of the compilation service module shown in FIG. 3.

Referring to FIG. 4, in one embodiment, a methodology for compilation service 50 is disclosed. Initially, compilation service 50 may load configuration parameters 100 that indicate the location of a particular search engine, as well as access related information regarding search engine availability. Next, compilation service may determine whether to modify an index 102, create an index 104, or delete an index 106 based on parameters passed from application agents 18. If compilation service 50 determines that an index is to be deleted, compilation service 50 may delete the existing index in the search engine 128 by accessing search indexes 126, creating an action entry 130 representing the deletion, and storing the action entry in a compilation log 132. If compilation service 50 determines that an index is to be created 104, compilation service 50 may create a new index 124 by associating the new index with the search engine 126, creating an action entry 130 representing the addition, and storing the action entry in compilation log 132.

If compilation service 50 determines that a modification of an index is required 102, compilation service 50 may first retrieve business content from knowledge repository 10 in one or more sets of information 108. Next for each set of business entity information retrieved, compilation service 50 may retrieve individual business entity details 110, convert business entity content to text 112 using core services 16, convert business entity content to attributes 114 (e.g. author, creation date, etc.) using core services 16, and determine for each business entity retrieved whether an index update operation is required based on a business entity status 116 retrieved from knowledge repository 10. Once the final business entity in a set is processed 118, compilation service 50 may process subsequent sets of business entities 120 until all the sets have been processed. Next, compilation service 50 may aggregate information relating to the number of business entities that have been added, updated or deleted to an index 122, create an action entry 130 and store the action entry in compilation log 132.

Clustering service 52 provides a generic service that may create multiple clusters of a knowledge base based on content similarity. Clustering service 52 provides information relating to the similarity between large volumes of information. For example, clustering service 52 may aggregate information in a knowledge base into hierarchical clusters by grouping information into a set of clusters with a parent cluster at its center, or divide an already existing set of clusters into smaller sets of clusters with additional parent clusters.

Figure 5:
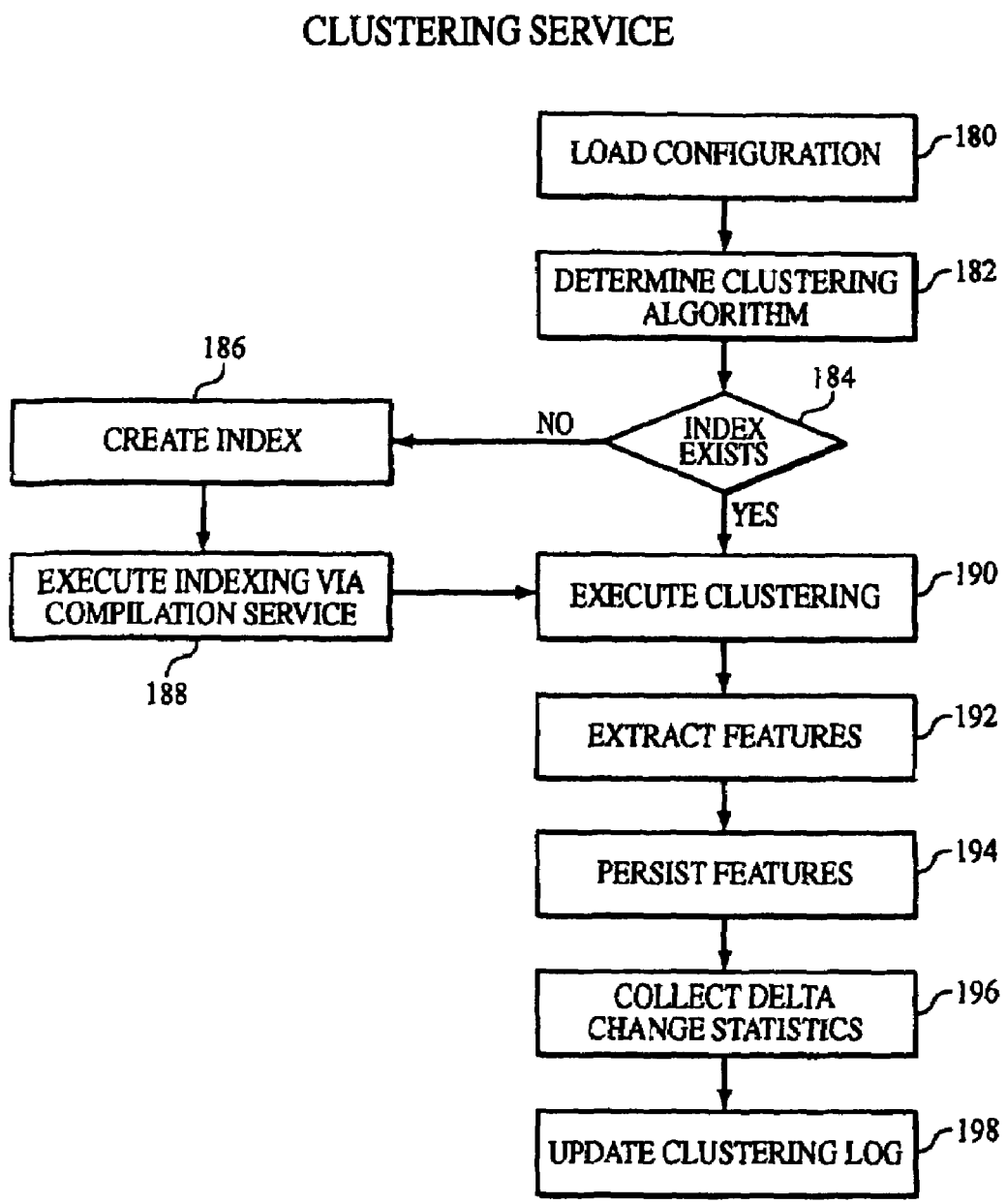
FIG. 5 is a block diagram of the clustering service module shown in FIG. 3.

Referring to FIG. 5, in one embodiment, a methodology for clustering service 52 is disclosed. Initially, clustering service 52 may load configuration information 180 that may indicate service initialization information. Next, clustering service may determine the type of clustering algorithm to be used for a specific knowledge base. In some embodiment, the clustering algorithm to use may be passed to clustering service 52 as input from application agents. Next, clustering service 52 may determine whether an index exists 184 for a particular knowledge base. If an index does not exist, clustering service 52 may create an index 186 and execute indexing 188 of the knowledge base via compilation service 50. Next, clustering service 52 may execute the clustering algorithm 190 and extract characteristic features 192 that distinguish one class of data from another. Next, clustering service will store these characteristic features 194 in a database, gather statistics relating to the process 196 (e.g. the number of additional classes that may be generated based on the clustering) and store these statistics in a clustering log 198.

Adaptation service 54 provides a generic service for learning engine 66 to adapt to new information. The adaptation of learning engine 66 may be configured via various approaches based on observational data formats or relationships to be adapted. In one embodiment, adaptation service 54 may have a generic API that may easily integrate with one or more learning engines depending upon the type of learning to be accomplished.

Figure 6:
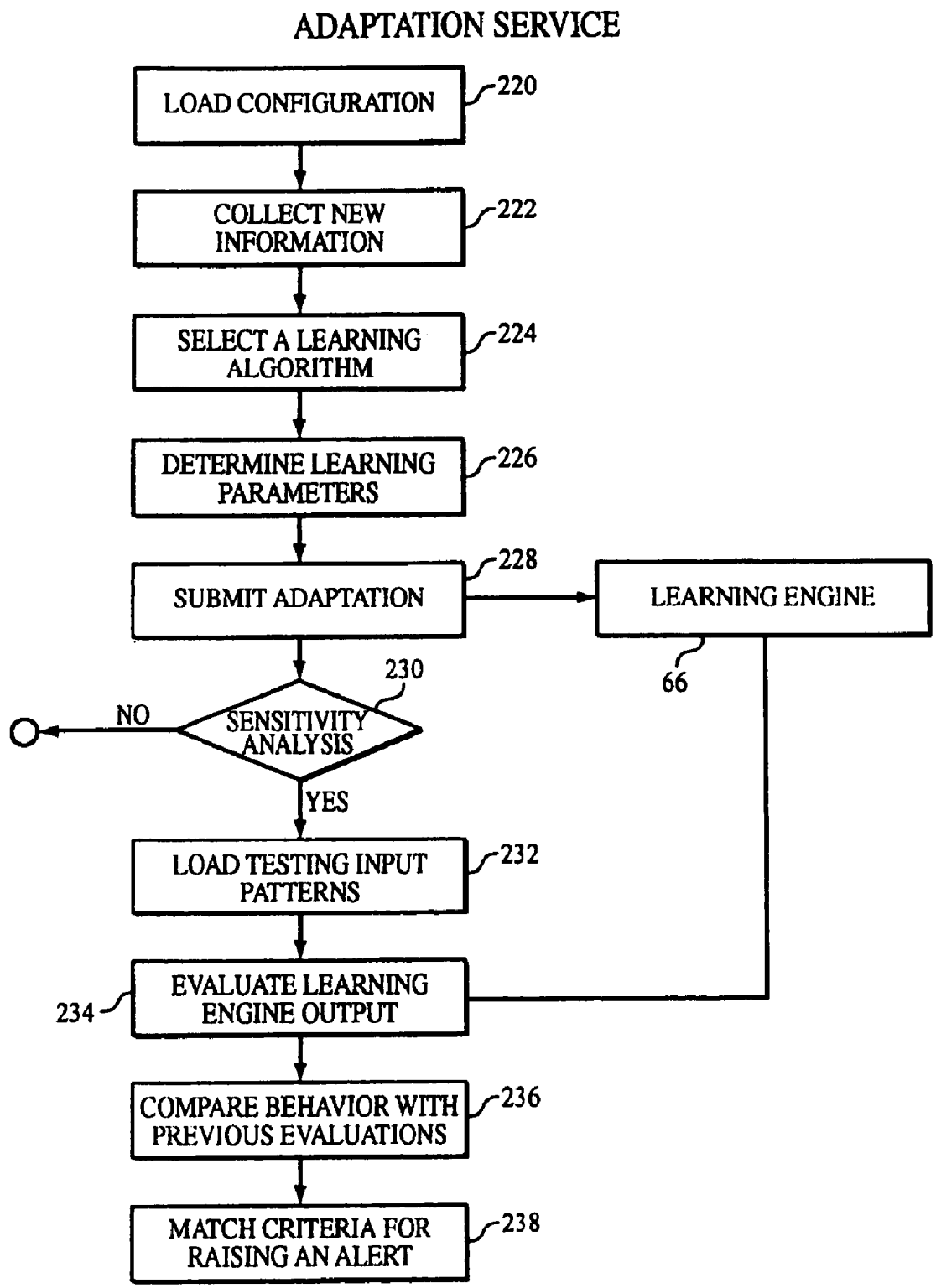
FIG. 6 is a block diagram of the adaptation service shown in FIG. 3.

Referring to FIG. 6, in one embodiment, a methodology for an adaptation service is disclosed. Initially, adaptation service 54 may access configuration information 220 relating to learning engine 66 as well as learning parameters. Next, adaptation service 53 may collect new information 222 from application agents 18 and select an appropriate learning algorithm 224 based on the nature of the new information. In some embodiments, adaptation service 54 may receive appropriate learning algorithms from application agents 18 as input. Next, adaptation service 54 may determine learning parameters 226 (e.g. speed of learning for the learning engine). In some embodiments, learning parameters also may be passed from application agents 18. In other embodiment, learning parameters may be stored in configuration information for the adaptation service. Next, adaptation service 53 may submit both the new information collected and learning parameters 228 to learning engine 66 for processing. Next adaptation service 53 determines whether a sensitivity analysis is requested 230. Sensitivity analysis may be used to determine the impact of the new information on learning engine behavior. If sensitivity analysis is selected, adaptation service 53 may load test input patterns 232 and retrieve learning engine output 234 based upon submitted information. Sensitivity analysis may also be conducted by generating small variations of input patterns to check the robustness of a learning engine. Next, adaptation service 53 may compare test input patterns to learning engine output 236. In some embodiments, adaptation service 53 may use the results of the comparison and match that comparison to criteria for raising an alert 238.

Pattern recognition service 56 provides services to explore and identify meaningful patterns. In one embodiment, pattern recognition service 56 may have a heuristic rule engine which may automatically determine which knowledge discovery engine 68 should be used under what kind of data population. Also, pattern recognition service 56 may start with trial algorithms and determine steps for different knowledge discovery tasks. In some embodiments, data cleansing techniques may be implemented to remove outlier data from datasets so that knowledge discovery engine 68 may recognize meaningful patterns. In other embodiments, advanced data cleansing techniques may be utilized by pattern recognition service 56 to check the consistency and reliability of data based on pre-defined data integrity rules. Most of the actions require statistical information computed from the data set, which may be retrieved from one or more knowledge bases.

Figure 8:
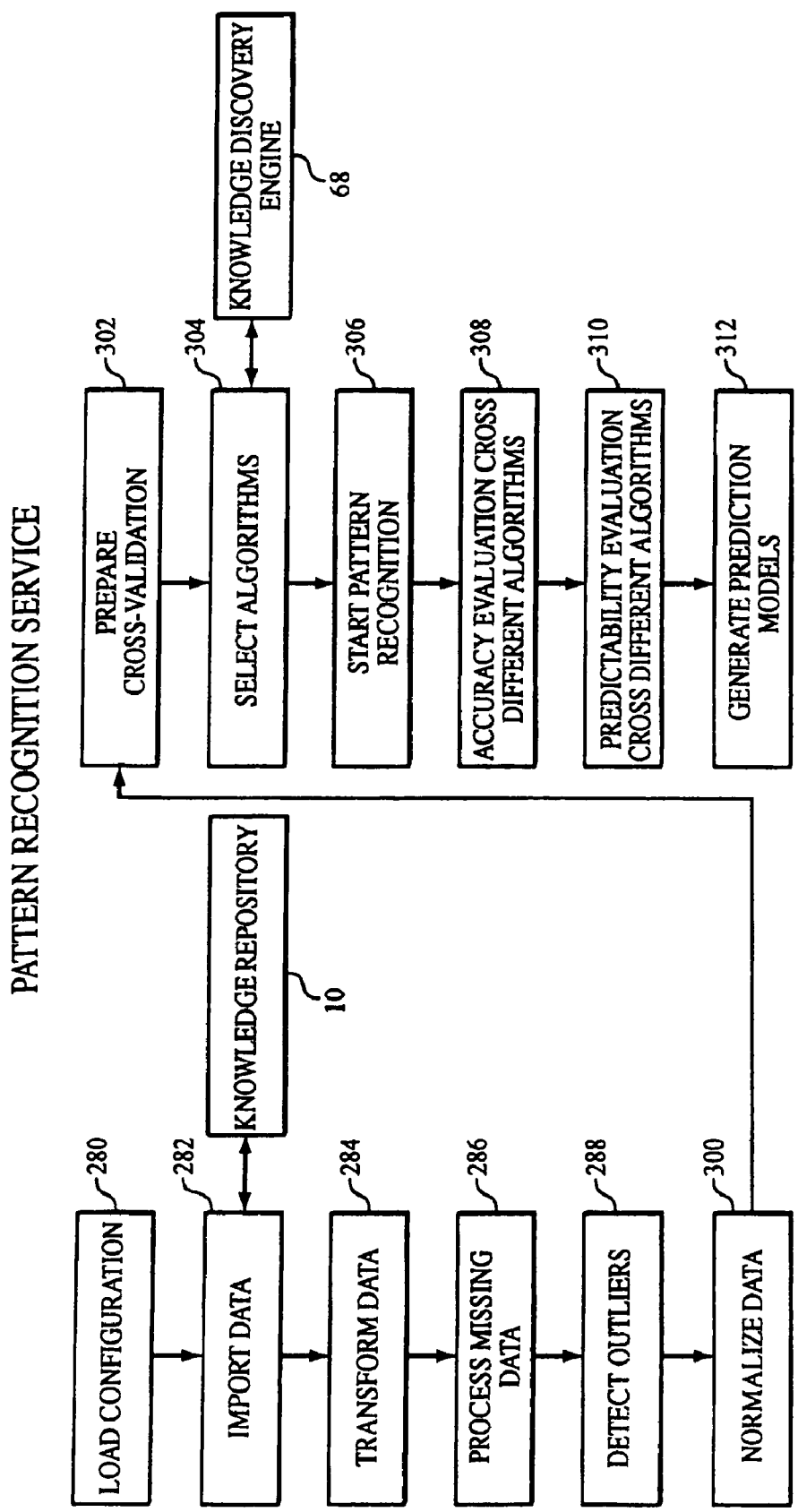
FIG. 8 is a block diagram of the pattern recognition service shown in FIG. 3.

Referring to FIG. 8, in one embodiment, a methodology for pattern recognition service 56 is disclosed. Initially, pattern recognition service 56 may load configuration information 280 relating to the location of input data and knowledge discovery engine 68. Next, pattern recognition service 56 may import data 282 from knowledge repository 10 and transform the data 284 as may be required. For example, in some problem domains, there may be a requirement to transform a particular classification of data (e.g. alphabetic representation of data to numeric representation). Next, pattern recognition service 56 may process any missing data from the import data 286. For example, in time series data, missing dates may be filled with a calculated average for present data points. Next, pattern recognition service 56 may identify outlier data 286 in the import data from knowledge repository 10. In some embodiments, pattern recognition service 56 may build a data distribution from import data and determine whether a particular data point should be included or excluded depending upon the data points statistical significance to the data distribution. Next, pattern recognition service 56 may normalize the data 300 and perform a cross validation process 302. In some embodiments, the cross validation process prevents over fitting of data by dividing normalized data into different data sets and randomly selecting from these data sets values to be passed to a knowledge discovery engine. Next, pattern recognition service 56 may select algorithms for identifying patterns 304 in the import data. In some embodiments, pattern recognition service 56 may receive the pattern identification algorithms from application agents 18. Next, pattern-recognition service 56 may start pattern recognition 306 by executing knowledge discovery engine 68 for each data set generated during cross validation. Upon processing of all the cross validated data sets, pattern recognition service 56 evaluate the accuracy 308 generated by various pattern-recognition algorithms used by knowledge discovery engine 68 as well as evaluate the predictability of various pattern-recognition algorithms 310 by comparing results from knowledge discovery engine 68 to test data. Next, pattern recognition service 56 may generate a prediction model 312 based on the predictability of various pattern-recognition algorithms.

Optimization service 58 formulates mathematical equations representing goals for a particular optimization problem and may select and execute a particular optimization engine 70 to achieve such goals. Optimization service 58 provides guidance to users on how optimization problems may be formulated, what types of assumptions may be made, and how realistic the problem formulation may be to actual problems. Optimization service 58 may guide the user to construct quantitative formulae by generating object functions and constraints.

Figure 7:
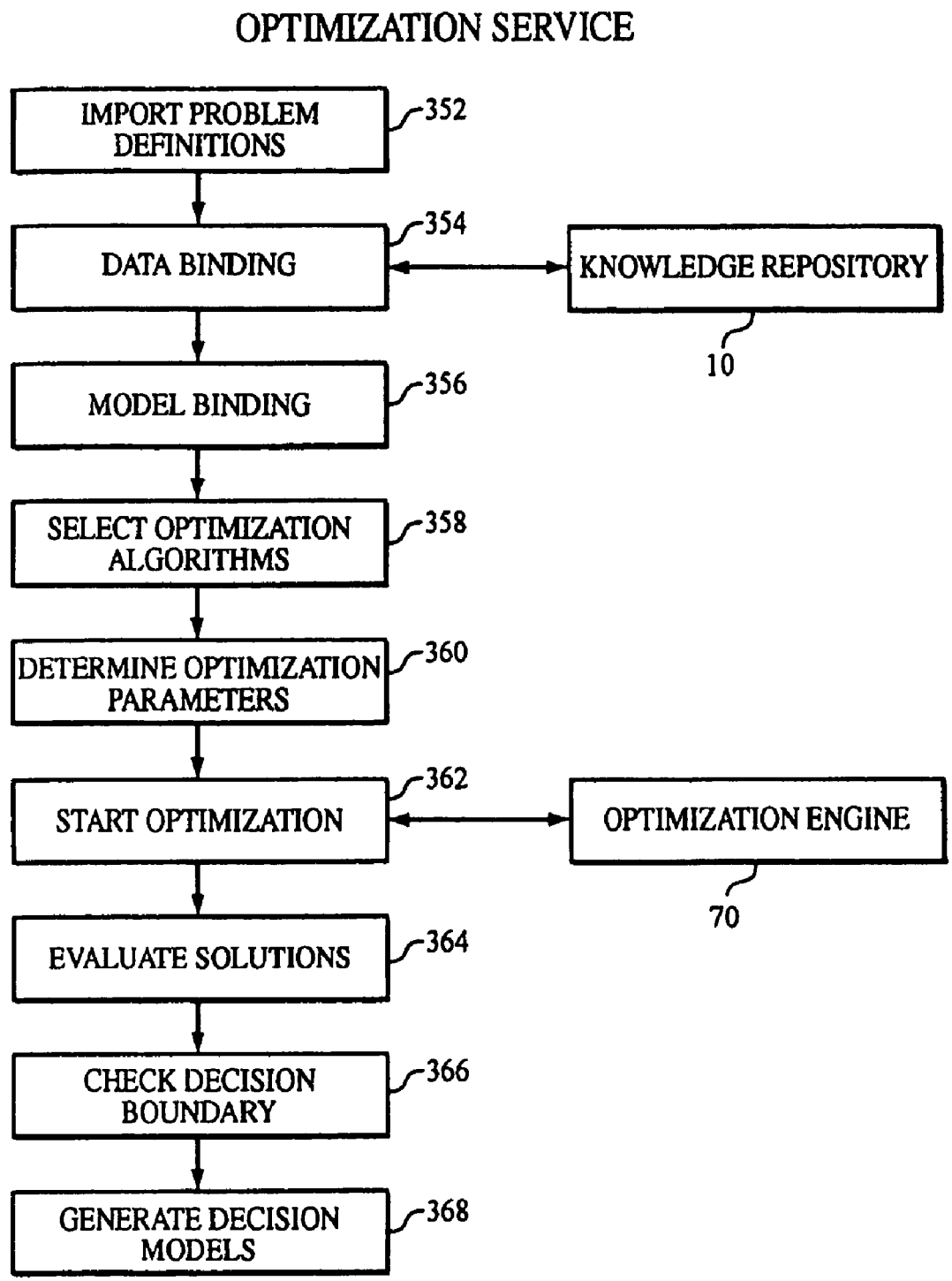
FIG. 7 is a block diagram of the optimization service shown in FIG. 3.

Referring to FIG. 7, in one embodiment, a methodology for optimization service 58 is disclosed. First, optimization service 58 may import problem definitions 352 that may be stored in configuration files. Next, optimization service may bind variables 354 stored in problem definitions with data representations stored in knowledge repository 10. Next, optimization service 58 may generate executable code that represents the problem definition 356. In some embodiments, optimization service 58 may generate programming objects (e.g., Java classes) that describe the problem definitions. Next, optimization service 58 may determine optimization algorithms that may be used to solve the particular problem. In some embodiments, optimization service 58 may receive the optimization algorithm as a parameter from application agents 18. In other embodiments, optimization service 58 may prioritize optimization algorithms based on the goal initially defined depending upon the suitability of selected algorithms to the optimization problem. In addition, the service may use one or more optimization algorithms in a hybrid fashion based on a particular set of conditions or criteria. Next, optimization service 58 may determine optimization parameters 360 (e.g., parameters indicating when to terminate execution of an optimization engine) to be used during the optimization process. Next, optimization service may initiate the optimization process 362 by executing optimization 70 and passing optimization parameters and an optimization algorithm as input. Upon completion of optimization engine execution, optimization service 58 may next evaluate optimization solutions 364 provided by optimization engine 70. For example, in some embodiments, optimization engine 70 may produce a set of solutions and optimization service 58 may select which solution of the set is most optimal by utilizing one or more mathematical algorithms. In some embodiments, optimization service 58 may monitor the progress of the optimization engine 70, and determine that different tuning parameters should be used during optimization engine 70 executions to assure that one or more solutions are found with reasonable accuracy.

Next, in some embodiments, optimization service 58 may then check decision boundaries 366. For example, in some embodiments, there may be several constraints and some solutions generated by optimization engine 70 may be more suitable than others under certain conditions. Next, optimization service 58 may then generate a decision model 368 based on the evaluation of solutions and decision boundary analysis.

Plan generation service 60 is provided that may direct individual agent functionality to achieve a goal based on observation of environment changes and feedback from other software agents.

Figure 9:
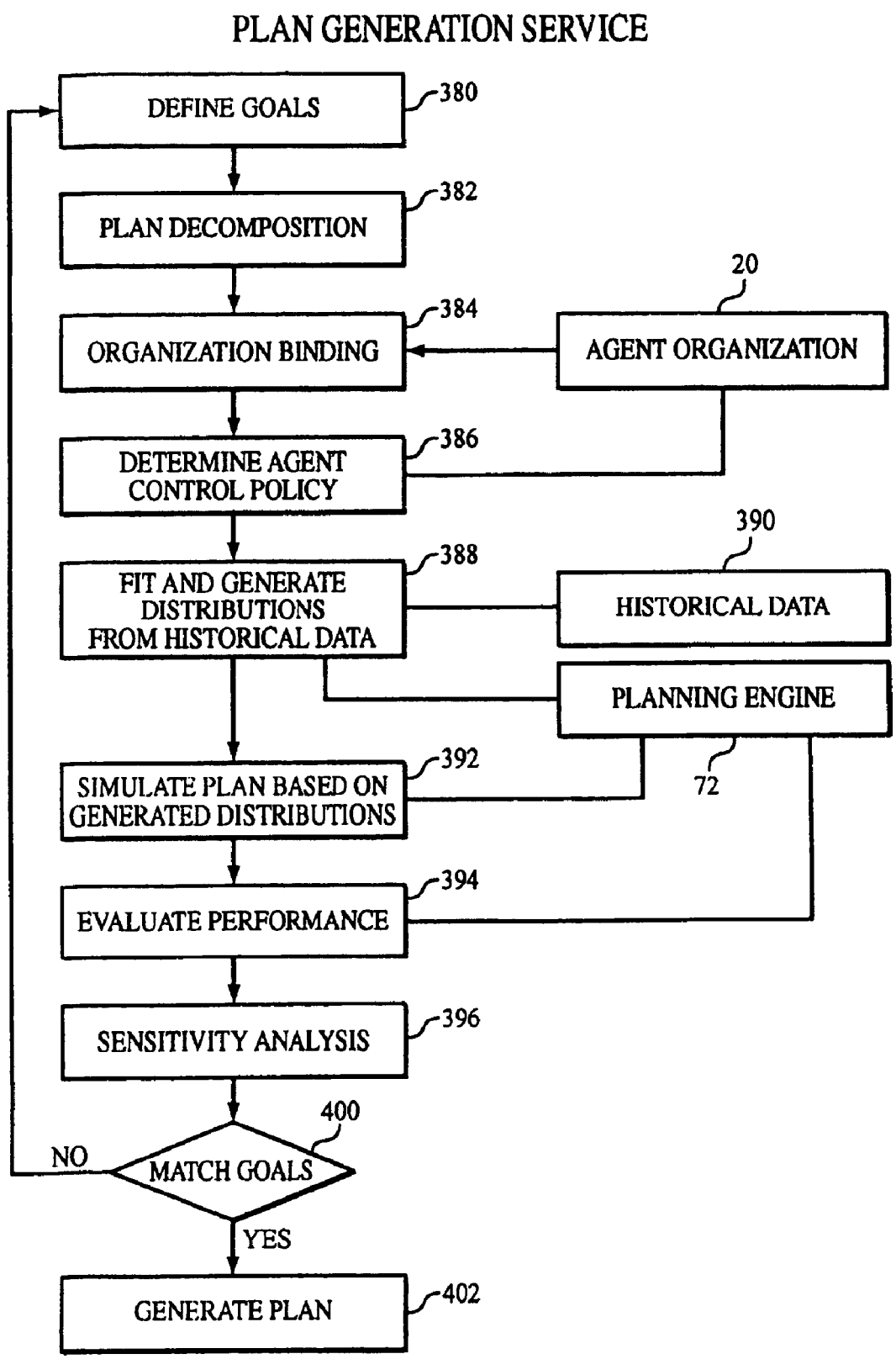
FIG. 9 is a block diagram of the plan generation service shown in FIG. 3.

Referring to FIG. 9, in one embodiment, a methodology for plan generation service 60 is disclosed. Initially, plan generation service 60 identifies a goal (e.g. an objective, plan) based on input from one or application agents 18. Next, depending upon the complexity of the plan, plan generation service 60 may decompose the goal 382 into several sub-plans so that a plurality of software agents may work simultaneously on reaching the goal simultaneously. Next, plan generation service 60 may bind particular software agents to sub-plans 384 based on the agent organizational hierarchy by using organization services 20. Next, plan generation service 60 may determine agent control policy 386 for binded agents by using organization services 20 so that resources may be distributed efficiently. Next, plan generation service 60 may fit and generate data distributions 388 from historical data 390 and simulate a plan 392 for execution by planning engine 72. Upon execution completion of planning engine 72, plan generation service 60 may evaluate plan performance 394 by comparing planning engine output to expected results. In some embodiments, plan generation service 60 may execute a sensitivity analysis wherein the simulated plan may be modified slightly to determine the effect on engine output. Next, plan generation service determines whether plan goals have been met 400. If plan goals have been met based on the evaluation of planning engine output, plan generation service 60 generates a plan 402.

Run-time intelligent services 34 are software modules that may be used by enterprise application agents 18 to accomplish assigned business tasks. Referring to FIG. 3, run-time intelligent services 34 include a query service 36, classification service 38, recommendation service 40, prediction service 42, decision service 44, and a plan adjustment service 46.

Query service 36 provides a set of application programming interfaces ('APIs') that allow enterprise application agents 18 to compose search queries based on free-form text or data attributes. The Query service 36 also provides a set of search methods that may be used in the search query including a fuzzy search, linguistic search, exact-term search, and Boolean search to retrieve relevant information from knowledge repository 10.

Figure 10:
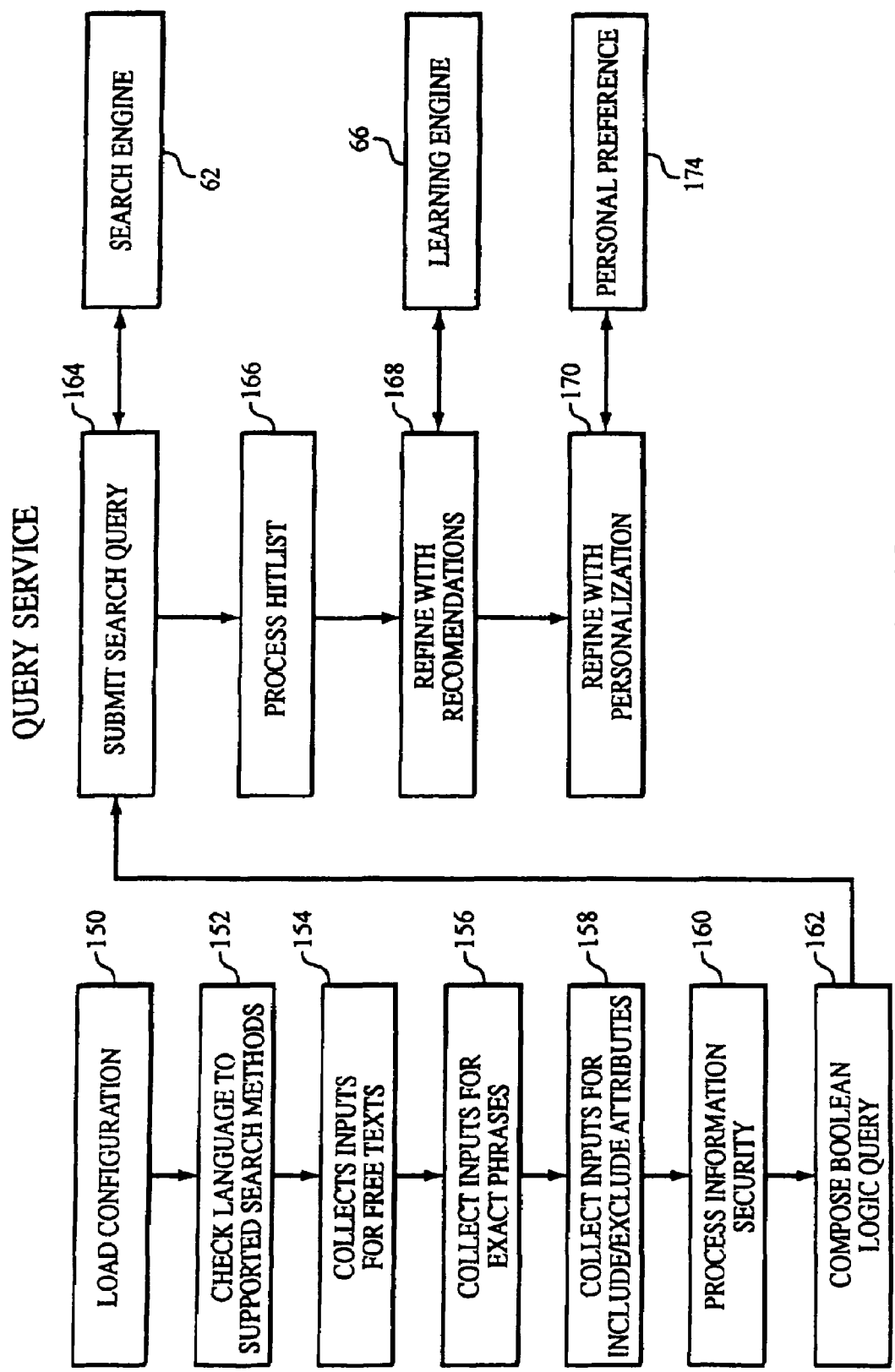
FIG. 10 is a block diagram of the query service module shown in FIG. 3.

Referring to FIG. 10, in one embodiment, a methodology for query service 36 is disclosed. Initially, query service 36 may access configuration information 150 relating to search engine 62 parameters and learning engine 66 parameters. Next, query service 36 may determine which search methods are supported by a particular language 152. For example, different languages may require different search methodologies. Next, query service 36 may collect input for free text searches 154, collect input for exact phrase searches 156, and collect inputs for either including or excluding specified attributes 158. Next, in some embodiments, query service 36 may process information security 160 relating to a query (i.e., a user need to have certain credentials established to retrieve specific information requested in a query). Next, query service 36 then may compose a Boolean logic query 162 based on the collected inputs and submit the Boolean query 164 to search engine 62. Upon completion of execution, query service 36 may receive search engine 62 output and process that output as a hit list 166. In some embodiments, query service may also refine the search engine 52 results and pass refined search results to learning engine 66 for recommendations 168. In addition, query service 36 may also access personal preferences 174 as input and refine search results based on those personal preferences 170. For example, search results may be sorted in a manner such that certain search results are always presented first in the hit list.

Classification service 38 provides a set of APIs that allow enterprise application agents 18 to pass text input descriptions into text mining engine 64 to classify information content stored in knowledge repository 10. Text-mining engine 64 then may compare the similarity of the input text description with the contents of a set of pre-compiled clusters stored in knowledge repository 10.

Figure 11:
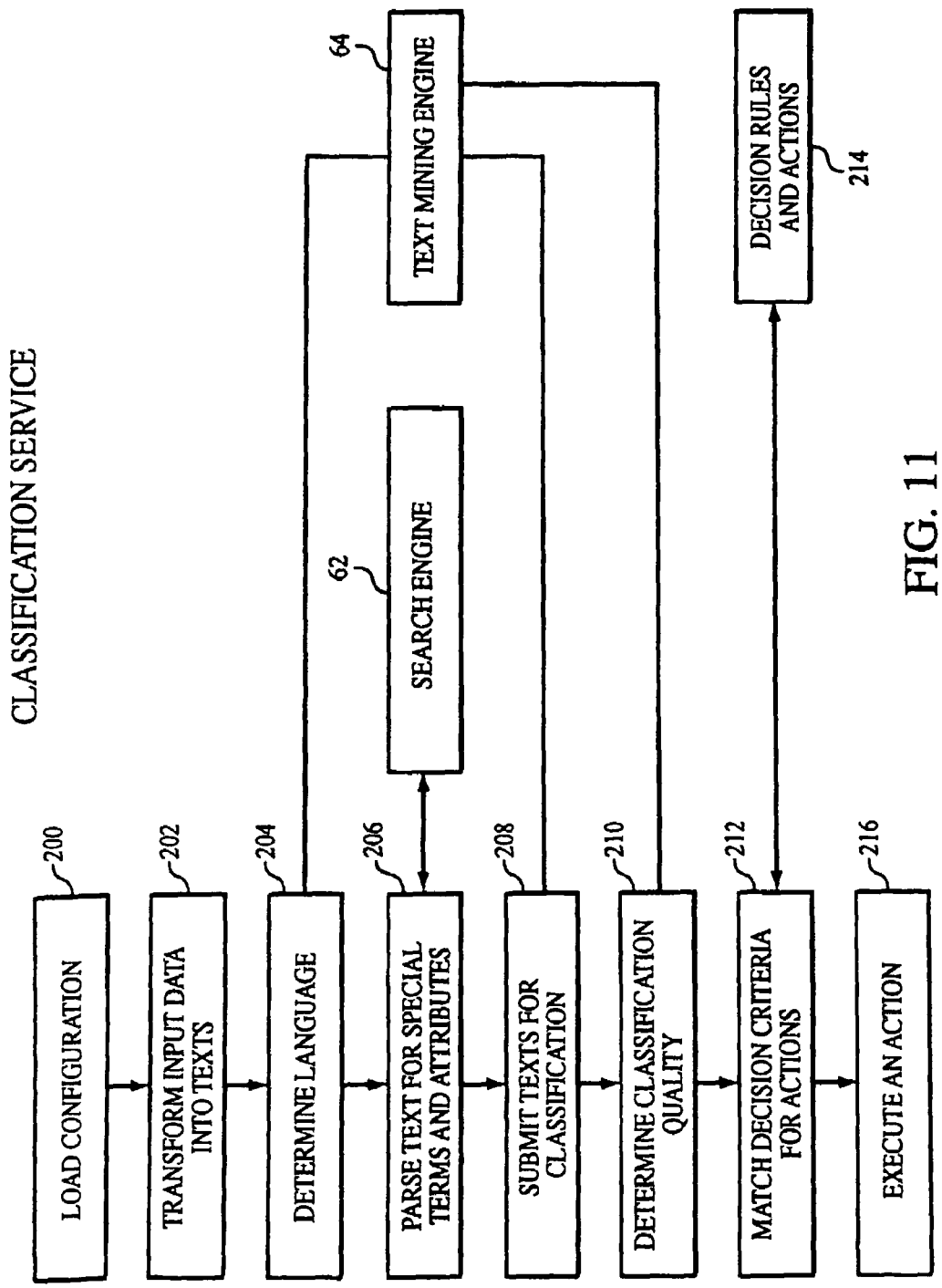
FIG. 11 is a block diagram of the classification service module shown in FIG. 3.

Referring to FIG. 11, in one embodiment, a methodology for classification service 38 is disclosed. Initially, classification service 38 may access a configuration information 200 that provides information relating to search engine 62 and text mining engine 64. Next, classification service 38 may transform input data into text using core services 16. For example, input data may be incoming e-mail or a form on the World Wide Web. Next, classification service 38 may execute text-mining engine 64 to determine the particular language contained in the text 204. Next, classification service 38 may execute a search engine 62 to parse the text for special terms and attributes 206. Next, classification service 38 may submit the text for classification 208 by executing text-mining engine 64 and passing the text as input. Upon text mining engine execution completion, classification service may receive text-mining engine results and determine classification quality 210 based on a predetermined value. In some embodiments, classification service 208 may access decision rules and actions 214 and determine whether an action, for example, a notification, is required based on the comparison. In the event the decision criterion for an action is met, classification service may execute an action 216.

Recommendation service 40 is provided to recommend proper and possible actions to enterprise application agents 18 based on collected information and user input received by enterprise application agent 18. Recommendation service 40 may accumulate interaction information and may determine an appropriate search space. For example, the same input information provided by application agent 18 at a first iteration and at a fifth iteration may generate different recommendations due to changes of possible action space between the first and the fifth iterations.

Recommendation service 40 may recommend a possible business process to application agent 18. For example, in one embodiment, business processes may be represented as interactive scripts. User interaction with such scripts and background information collected by enterprise application agents 18 may be used by recommendation service 40 as input to learning engine 66. Recommendation service 40 may then directly communicate with application agents 18 to recommend a business process.

In another embodiment, recommendation service 40 may recommend possible actions by an application agent. Similar to business process recommendations, interactive scripts may be used to represent a course of action. Given the inputs from a user, background information and allowable actions provided by application agent, recommendation process 40 may make a recommendation about which action an application agent may take. The recommendation process 40 may also expand the course of action for the interactive script or a set of interactive scripts. Since recommendation service 40 may not execute the actions, application agents 18 may consider the details and complexity related to a transaction.

Figure 15:
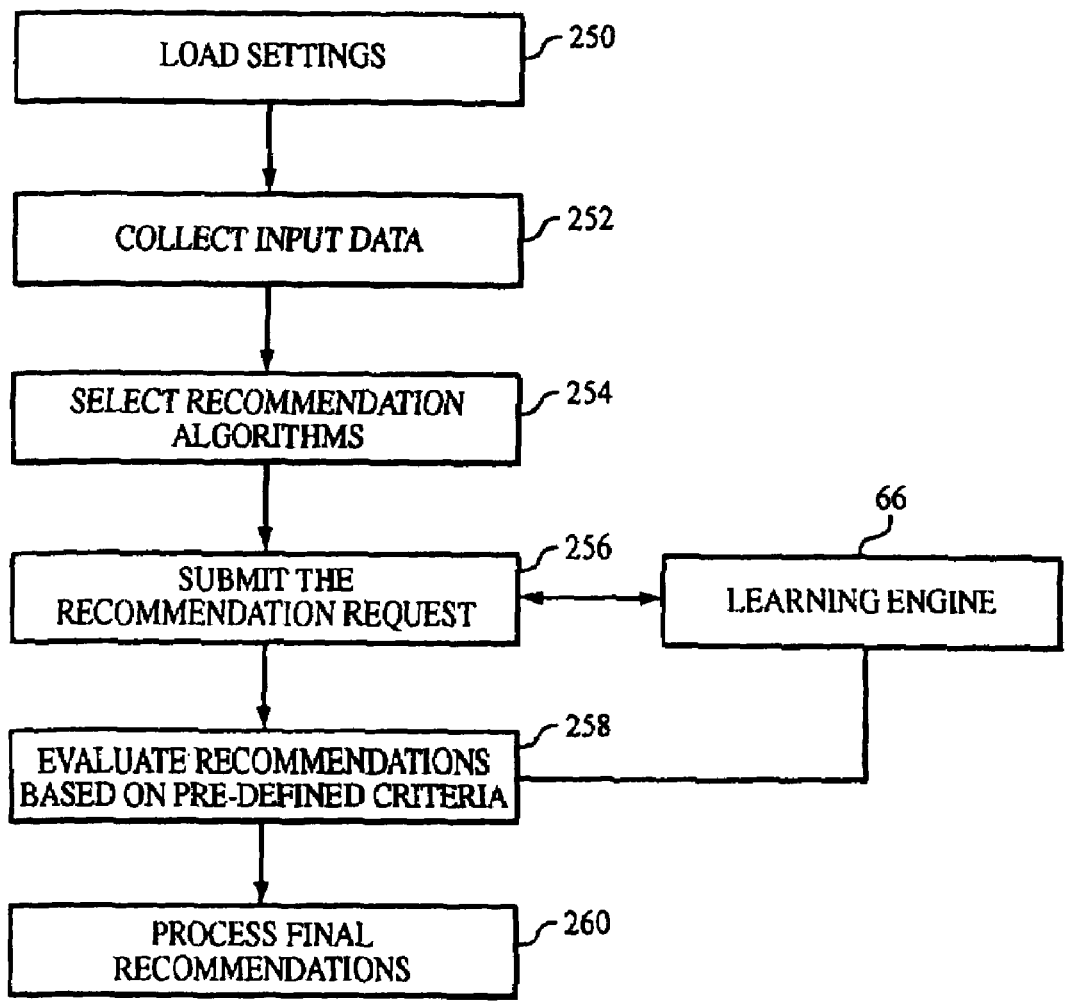
FIG. 15 is a block diagram of the recommendation service shown in FIG. 3.

Referring to FIG. 15, in one embodiment, a methodology for recommendation service 40 is disclosed. Initially, recommendation service 40 may access configuration information 250 relating to learning engine 66 parameters. Next, recommendation service 40 may collect input data 252 from application agents 18 requesting a recommendation. Next, recommendation service 40 may select the particular recommendation algorithm that learning engine 66 may utilize. For example, in some embodiments, spread activation algorithms may be selected to discover non-obvious relationships among data. In some embodiments, recommendation service 40 may select the recommendation algorithm based on the nature of collected data. In other embodiments, recommendation service 40 may select the recommendation algorithm based on input parameters received upon invocation. Next, recommendation service 40 may execute learning engine 66 and pass as input the collected data along with commands to execute a particular learning algorithm 256. Upon execution completion of learning engine 66, recommendation service 40 may evaluate learning engine output based on pre-defined criteria 258. If the learning engine output meets or exceeds the predefined criteria, recommendation service 40 may output a final recommendation 260 to application agents 18.

Prediction service 42 provides a set of APIs that allows enterprise application agents 18 to pass a set of known information to obtain predictions from previously constructed models using data stored in knowledge repository 10. The format of the models may be varied and utilize one or more data-mining techniques. For example, econometric models may utilize mathematic formula, one or more association rules, and a decision tree.

Figure 12:
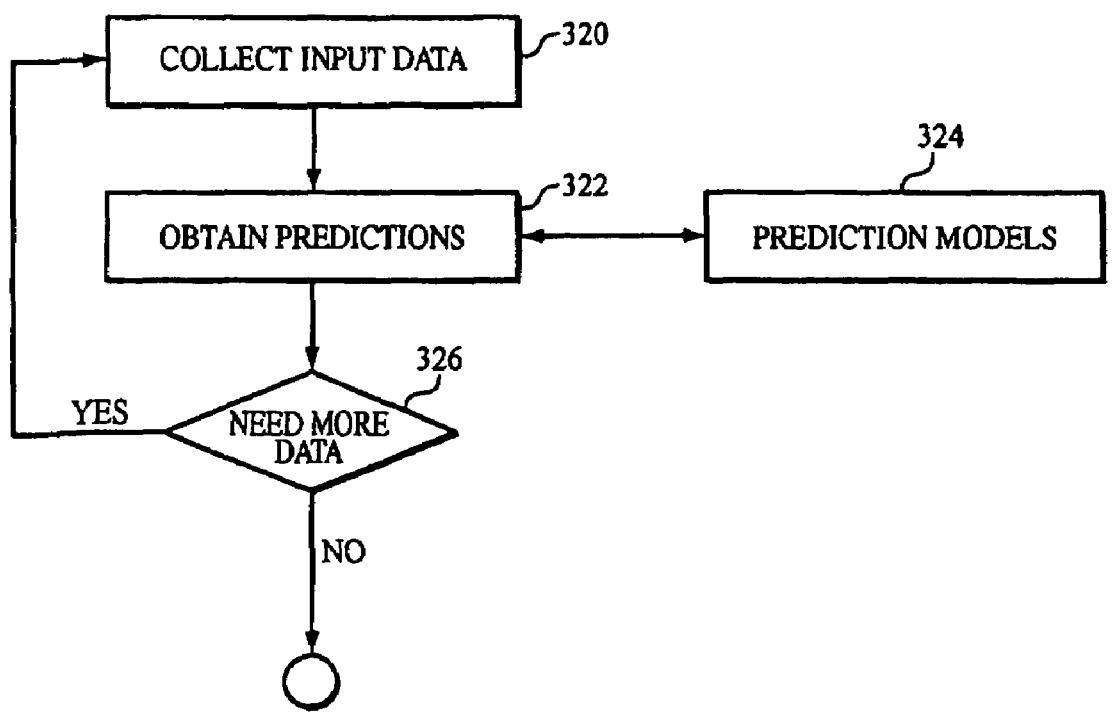
FIG. 12 is a block diagram of the prediction service shown in FIG. 3.

Referring to FIG. 12, in one embodiment, a methodology for prediction service 42 is disclosed. Prediction service 42 may collect data 320 from application agents 18 and execute prediction models 324 by passing as input collected data. Next, prediction service 42 may obtain predictions 322 from prediction models and determine whether a sufficient amount of data was passed 326 based on the quality of prediction results. In the event more data is needed, prediction service 42 may collect additional data from application agents 18.

Decision service 44 provides a set of APIs that allow application agents 18 to pass a set of known information, criteria, goals and constraints to optimization engine 70 to identify an optimal statistical decision, or a deterministic optimal decision based on either linear programming or a non-linear programming approach.

Figure 13:
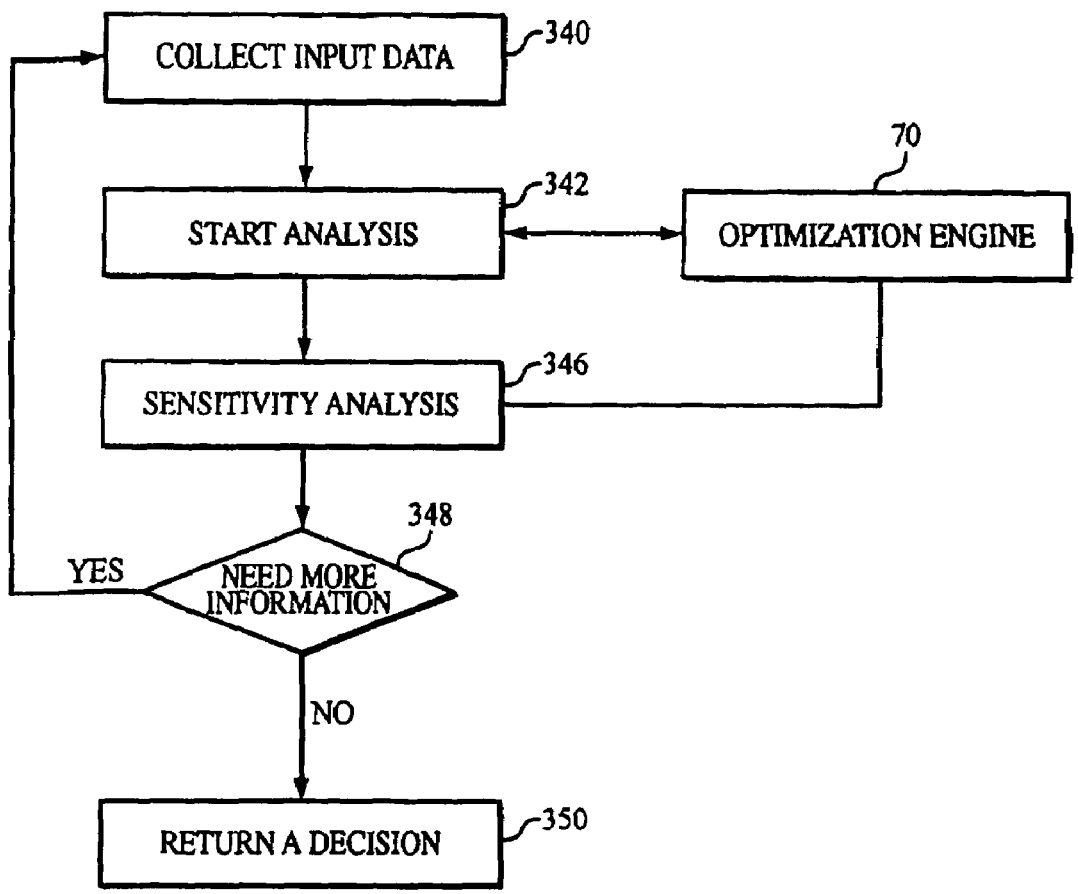
FIG. 13 is a block diagram of the decision service shown in FIG. 3.

Referring to FIG. 13, in one embodiment, a methodology for decision service 44 is disclosed. Initially, decision service 44 may collect input data from application agents 18 and pass the input data to optimization engine 70. Next, decision service 44 may initiate an analysis 342 by executing optimization engine 70. Upon execution completion of optimization engine 70, decision service 44 may receive optimization engine 70 outputs. Next, decision service 44 may perform a sensitivity analysis 346 to determine, based on calculated statistics, whether additional input data may be needed 348 to generate a quality decision from optimization engine 70. If additional data is needed, decision service 44 may collect additional data from application agents 18. Otherwise, decision service 44 may return the decision 350 generated by optimization engine 70.

Plan adjustment service 46 is provided that may monitor plan performance, collect available information that may impact plan generations, and adjust plans based on a determination of whether plan goals may be achieved. In some embodiments, for example, planning engine 72 may not have sufficient information during initial plan generation to generate an optimal plan. Plan adjustment service 46 may monitor the performance of such plans and determine whether plan goals may be achieved. In one embodiment, collected information is the direct results of a current plan.

Figure 14:
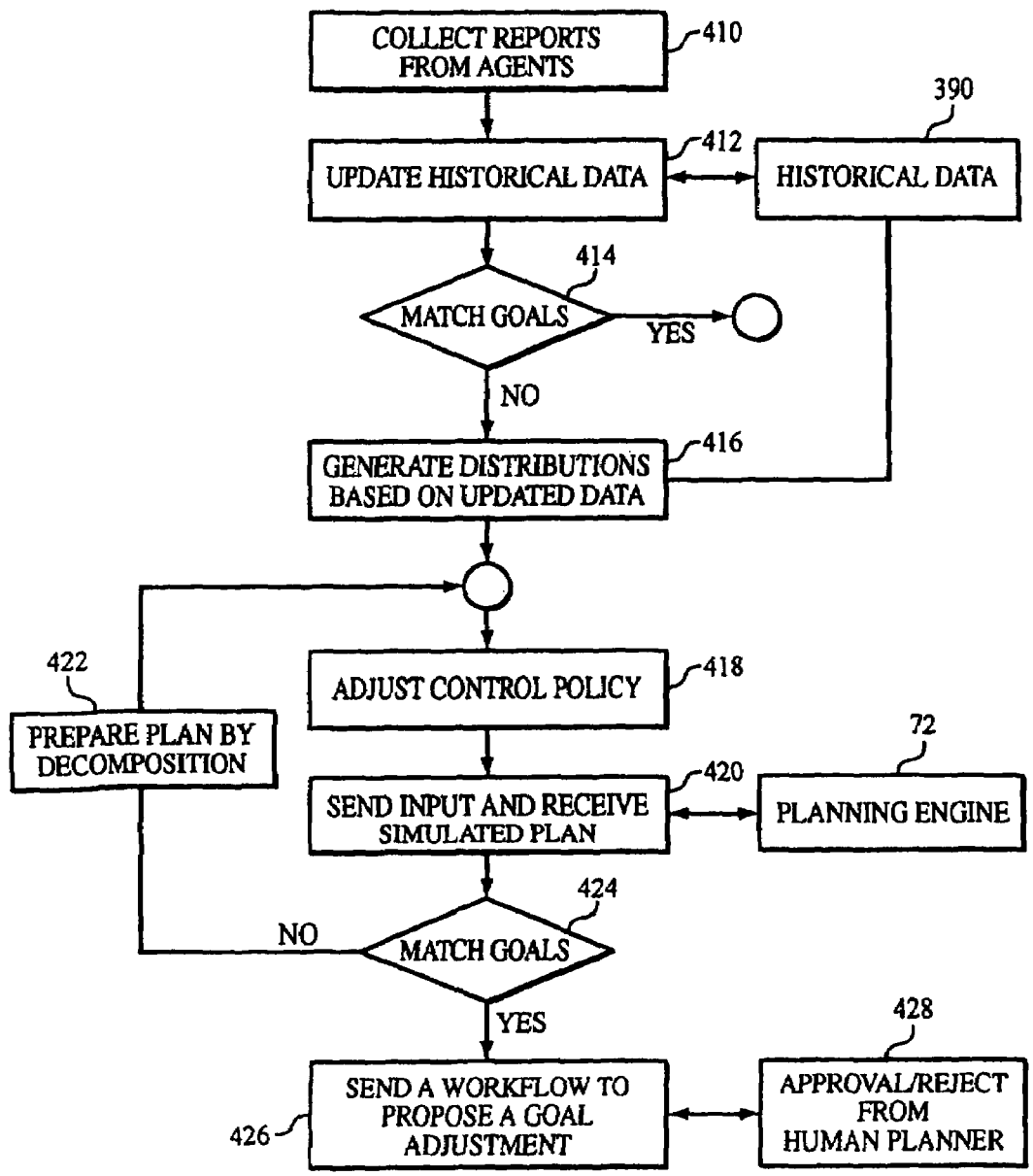
FIG. 14 is a block diagram of the plan adjustment service shown in FIG. 3.

Referring to FIG. 14, in one embodiment, a methodology for plan adjustment service 46 is disclosed. Initially, plan adjustment service 46 may collect information 410 relating to application agent performance from application agents 18. Next, plan adjustment service 46 may generate new performance information 412 by accessing prior historical data 390 and adding application agent performance data. Next, plan adjustment service 44 may determine whether the generated new performance data continues to match goals established for the plan 414. If the new performance data no longer matches the goals associated with the plan, plan adjustment service 46 then may generate data distributions based on the updated data 416, adjust agent control policy 418, and execute planning engine 72 by passing as input the data distributions. Upon execution completion of planning engine 72, plan adjustment service 46 may receive a simulated plan from planning engine 72 and compare the simulated plan to goals 424. If the simulated plan does not match the goals, plan adjustment service 46 may further refine the plan by decomposing it further 422 and reinitiate execution of planning engine 72. In some embodiments, if the simulated plan meets the goals established, plan adjustment service 46 may generate a workflow 426 to propose a goal adjustment. In other embodiments, plan adjustment service 46 may automatically provide the new simulated plan to software agents.

Figure 16:
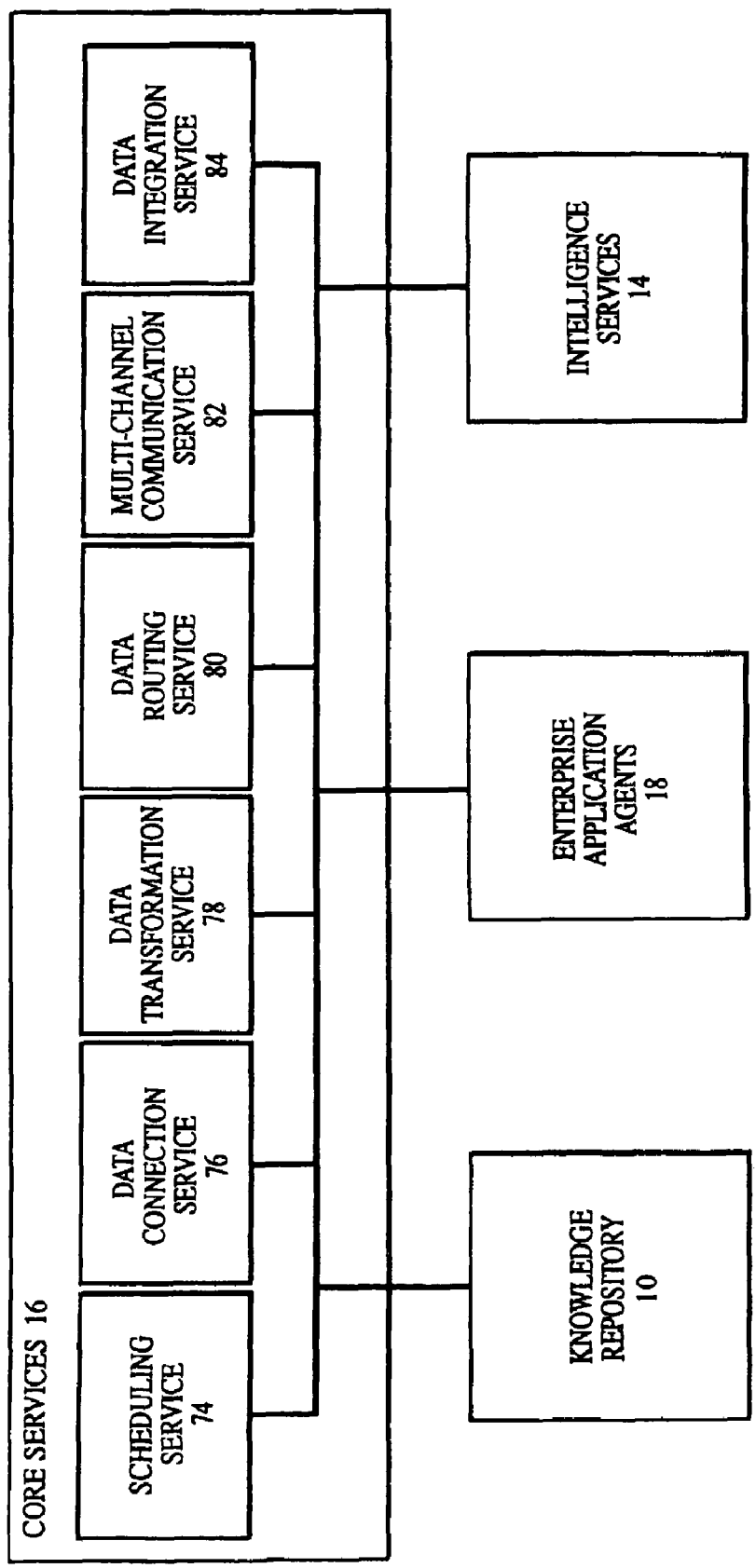
FIG. 16 is a block diagram of core services shown in FIG. 1.

Referring to FIG. 16, core services 16 are provided by the system to enterprise application agents 18 or intelligent services 14 to access, extract, transform, integrate, synchronize and route data in a distributed environment. Core services 16 are designed for flexibility. For example, a new service may be easily integrated into the system and the whole or part of core services 16 may be substituted by a new design without impacting enterprise application agents 18 or intelligent services 14.

Referring to FIG. 16, a multi-channel communication service 82 is provided that converts various input formats into recognizable formats for software agents. For example, information from various communication channels such as email, telephony, fax, paging message, or voice, may need to be converted into text formats with structure defined by extensible markup language ('XML') or resource description architecture ('RDF'). By utilizing multi-channel communication service 82, enterprise application agents 18 may be independent of these various communication channels.

A scheduling service 74 is provided as part of core services that provides a centralized timer to control and schedule a sequence of tasks to be completed by enterprise application agents 18. In one embodiment, the scheduling service may use a scheduling timesheet that contains information about the schedule and the tasks to be executed by application agents.

A data connection service 76 is provided as part of core services that allows intelligent engines to manage and control information sources from relational databases, ERMs, as well as mainframes. In one embodiment, connection definitions are stored in an XML property file. One advantage of storing connection definitions in a XML property file may be the ease of switching from one data/information source to another by redefining the connection in the XML property file.

A data transformation service 78 is provided that allows intelligent engines to work with consistent data structures. For example, there may be a requirement for an intelligent engine to interpret data stored in industrial specific XML formats (e.g. Rosettanet). In one embodiment, the conversion may be done using an XSLT engine with a repository of registered converters written in XSL to convert from one format to another.

A data routing service 80 is provided for data movement from one server to another based on pre-defined routing rules. In one embodiment, data routing rules may be defined in XML property files. XML property files may be routed from one place to another based on a routing plan obtained by a routing service. One advantage of this may be the avoidance of router maintenance for each server in a routing plan. In other embodiments, an intelligent business routing agent may manage rule-based routing.

A data integration service 84 is provided to resolve heterogeneous/inconsistent data sources. In distinction to data transformation service 78 that may convert data from one format to another, the data integration service 84 consolidates information from multiple data sources. When the information comes from multiple data sources, there may be a requirement to merge or use additional processes to integrate the information based on content.

Enterprise application agents 18 are provided that execute business processes inside the system. Enterprise application agents 18 may be assembled from various intelligent services 14 and core services 16 to achieve goals defined for the agent. In one embodiment, for example, a workflow process may be built using data routing services 80 and scheduling services 74. Application agents 18 may perceive information from the environment and respond to environmental changes. Application agents 18 may or may not have adaptive capability components since some business applications require stable and predictable behavior (e.g., retrieve information from heterogeneous data sources). The determination of which system components may be assembled for agents may be determined by business process requirements.

Figure 17:
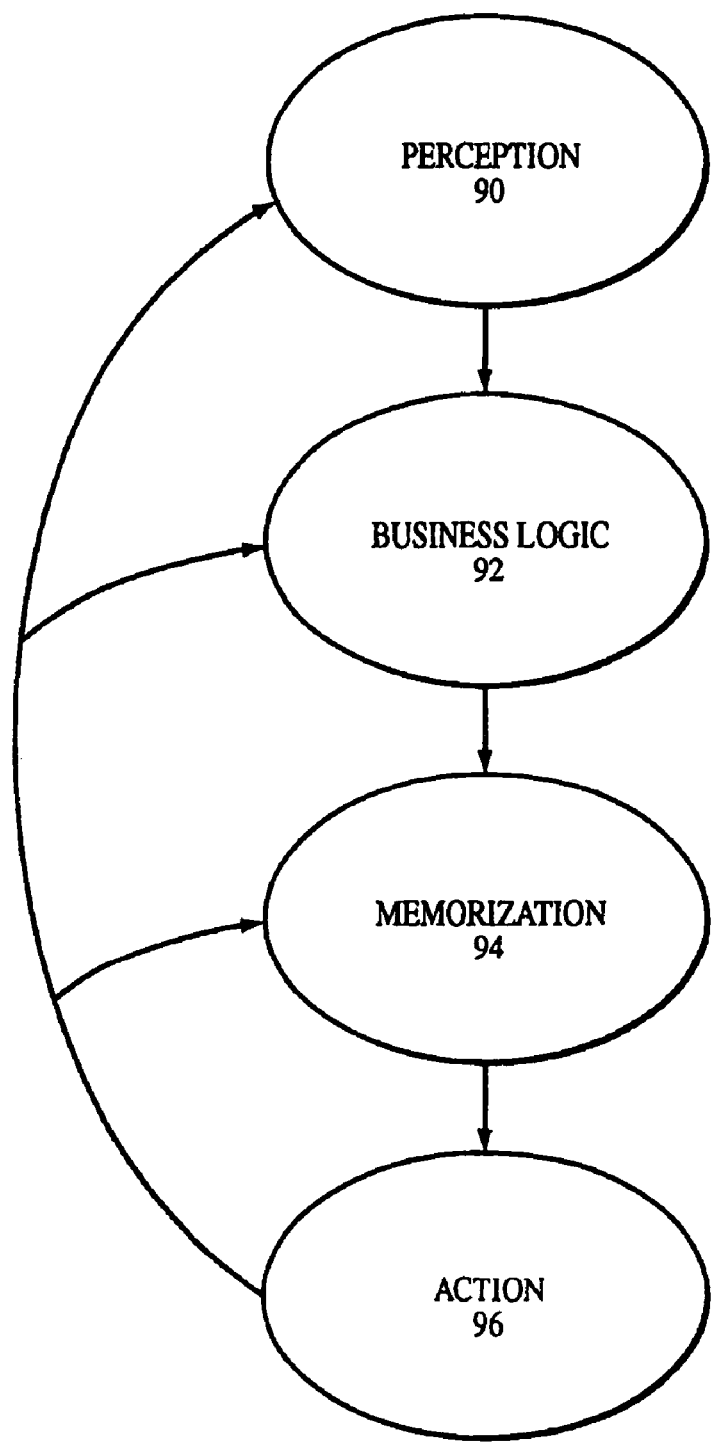
FIG. 17 is a block diagram of the conceptual layers of enterprise application agents shown in FIG. 1.

Referring to FIG. 17, the conceptual layers for an enterprise application agent and possible interactions among layers are illustrated. The conceptual layers may include a perception layer 90, a business logic layer 92, a memorization layer 94 and an action layer 96. Perception layer 90 may retrieve information from different communication channels, and utilize core services 16 to convert information to formats understood by other components in the architecture. Business logic layer 92 may process input information received from perception layer 90 based on pre-defined business logic. Intelligent service 14, which may reside in business logic layer 92 and memorization layer 94 may be triggered to retrieve and restore complicated knowledge representation and learned information. The business logic layer then can make optimal decisions based on pre-defined goals. The decision may be executed by Action layer 96 may complete a task, communicate with other agents, or send feedbacks back to its own perception layer 90, business logic layer 92 and memorization layer 94 for further processing.

Figure 18:
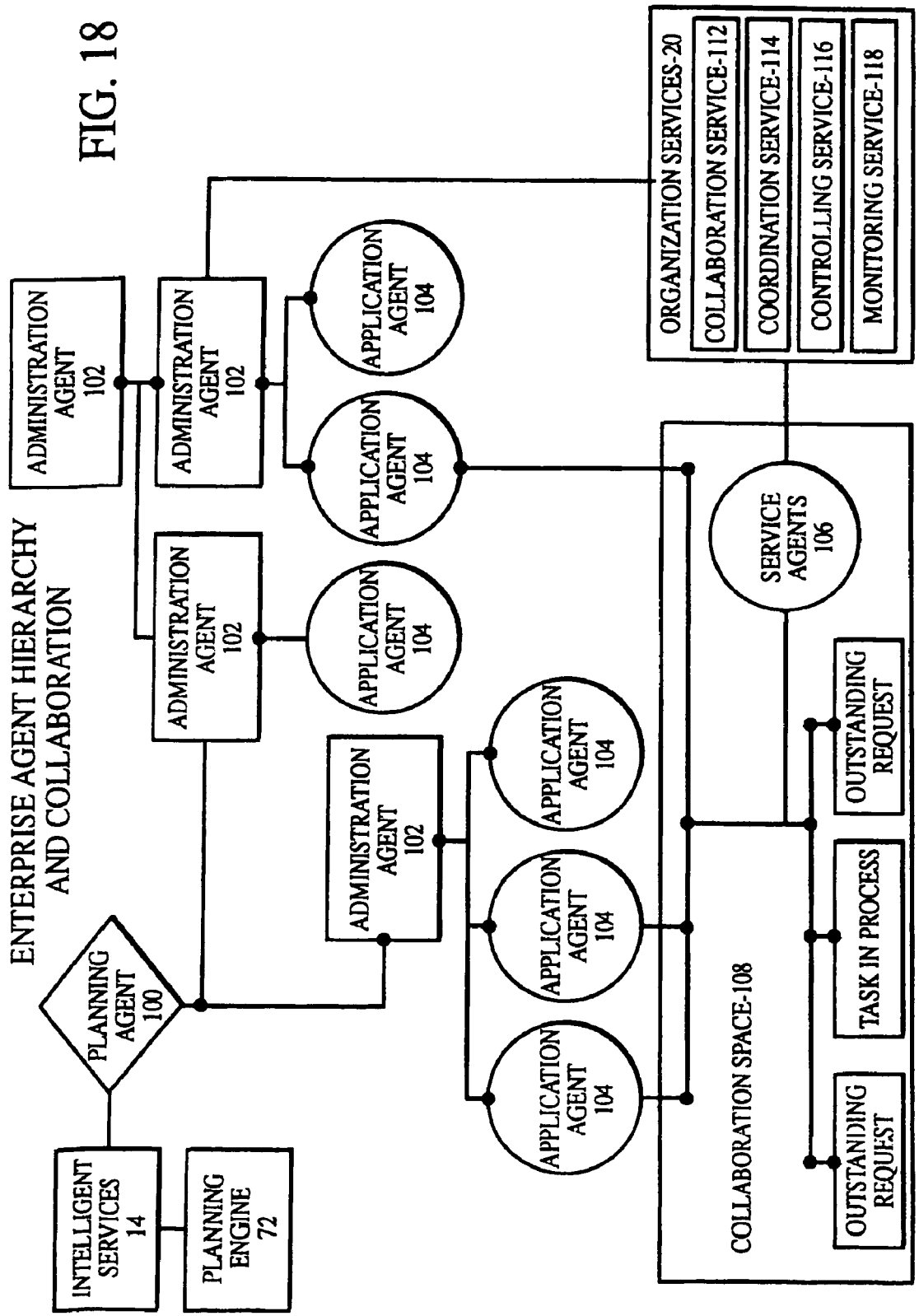
FIG. 18 is a block diagram of an enterprise application hierarchy and collaboration workspace.

A multi-agent environment 23 provides a collaborative environment for enterprise application agents 18 to interact. As illustrated in FIG. 18, enterprise application agents 18 may be organized under an organizational hierarchy and perform various roles. Referring to FIG. 18, four different enterprise application agents are defined. The agents include a planning agent 100, an administration agent 102, an application agent 104 and a service agent 106. Although only four agent types are illustrated in FIG. 6, the system is not limited to these agent types. For example, complex organizational hierarchies may be introduced by adding additional agents (e.g., multi-layer management agents, policy making agents, performance evaluator agents, etc.) to the system. In other embodiments, collaboration among enterprise agents may be achieved without introducing planning or administration agents.

As illustrated in FIG. 18, planning agent 100 is provided which interacts via intelligent services 14 with planning engine 72 to provide a plan that may meet a goal assigned to an enterprise application agent. Each planning agent may interact with one or more administration agents, although such interaction is not required.

Administration agent 102 may control, coordinate and monitor enterprise application agents 104 directly under its control. Administration agent 102 may create new application agents; terminate inactive application agents, and other administration agents that may have inactive application agents under its supervision. In some embodiments, administration agent 102 may have a set of tasks defined for its execution and may assign individual tasks to application agents under its control. Administrative agents 102 also may receive directives from planning agents 100 and adjust system resources used by enterprise application agents dynamically on demand. Administration agents 102 also may monitor and optimize the performance of application agents under control by monitoring the efficiency and effectiveness of application agents and comparing application agent performance with a goal assigned by planning agent 100.

Application agents 104 may execute business actions for assigned tasks. In one embodiment, application agents 104 may maintain states indicating whether application agent 104 is executing a task or not executing a task. Application agents 104 not executing tasks may access a collaboration space 108 to query whether outstanding requests may need to be completed. If outstanding requests exist, application agent 104 may fetch the request from collaboration space 108 and attempt to complete the request. In some embodiments, once application agent 104 completes the task, application agent 104 may post a complete message to collaboration space 108 indicating a status message of success or failure.

Application agents 104 may be instantiated and terminated by administration agents 102 to optimize system resources. For example, application agents 104 may be subject to termination by a supervising administration agent 102 if an inactive state exists. In some embodiments, application agents 104 may be reinitialized with new tasks. In other embodiments, application agents 104 may not be terminated and may be immediately assigned to different business tasks under the demand of an administration agent.

Service agents 106 are provided that support inter-communication among one or more application agents and provide organization services 20 for other agents.

A collaborative space 108 is provided by the system for collaborative business scenarios. In one embodiment, collaborative space 108 allows application agents 104 to post requests, or take requests for processing. Service agents 106 also may provide a communication protocol for application agents 104 to interact with other application agents.

Organization services 20 may be provided by the system for communication among agents within an organizational hierarchy. Organization services may include a collaboration service 112, a coordination service 114, a monitoring service 118, and a controlling service 116. In one embodiment, organizational services may be restricted to different agent roles and thus provide a hierarchical structure among agents (e.g. service agents 106).

Controlling service 116 provides for the fine-tuning and modification of application agent 104 behavior. Controlling service 116 is accessible to both administrative agents 102 and service agents 106. In some embodiments, administrative agents 102 and service agents 106 may conduct the following activities: test whether an application agent is executing, request an application agent to stop executing, modify a set of parameters pre-defined by an application agent to fine tune the agent functionality, redirect intelligent service used by an application agent, as well as initialize, reset or modify the learning parameters to modify application agent learning capability and speed. In other embodiments, controlling service 116 may be used to analyze an agent's activity log as well as summarize the performance of a group of application agents under control of either administrative agents 102 or service agents 106.

Coordination service 114 provides a service for administration agents 102 to coordinate activities of sub-ordinate agents. Coordination service 114 may be used by administration agents 102 to evaluate the performance of sub-ordinate administration agents and application agents 104 based on utilizations, efficiency and effectiveness. Furthermore, coordination service 114 may provide statistics to determine how application agent performance compares to goals set by a planning agent 100. In one embodiment, where application performance is a critical condition, coordination service 114 also may provide an escalation path to raise an alert to administration agents 102, planning agents 100, or a system administrator to remedy a particular situation.

An agent monitoring service 118 is provided to observe and record application agent performance. Information may be collected and reported to administration agents 102 which may make decisions to either modify an application agent's 104 learning capabilities, modify an application agent's 104 business layer or control application agent 104 overall execution. In one embodiment, administrative agent 102 may provide information to planning agent 100, the planning agent 100 responsible for providing specific commands and directives to control application agent 104. In one embodiment, agent monitoring service 118 may record the following information: basic log information including time and reason application agent is instantiated, the number of tasks executed by application agent 104, the amount of time each task requires, what communication may have been conducted between application agents to complete a task, and performance log information regarding the effectiveness and efficiency of application agents in solving assigned tasks.

Collaboration service 112 is provided which may assist application agents 104 and service agents 106 in interacting with other application agents in collaboration space 108. In one embodiment, application agents 104 and service agents 106 may utilize collaborative service 112 to communicate with other agents via a blackboard approach which may allow application agents to post requests on the blackboard and wait for a replies. In other embodiments, application agents 104 and service agents 106 may connect to collaboration space 108 to communicate with other agents via a peer-to-peer architecture where an agent, after registering for such a role, may freely interchange information with other agents.

The system provides a distributed environment where application agents may or may not reside on the same server. Such a distributed design may assure that information sources and business processes are distributed at multiple locations. For example, the location of information sources may be an ERP, a remote database management system, a legacy system, a mobile server, or even a client's workstation. With the development of peer-to-peer ('P2P') architecture, the distributed design may be extended even further. For example, the system may dispatch a P2P agent to a client for tasks that require information exchange or knowledge transfer among P2P agents without the need for the system to monitor such an activity.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

Other implementations are within the scope of the claims.

What is claimed is:

1. A computer system comprising:
   core service software modules, wherein each core service software module comprises program instructions that when executed perform core service functions that interact with a data source, each core service software module being callable by a software program module, and when called, is provided with information identifying a core service function to be performed and identifying a data object upon which the identified core service function is to be performed, wherein one of the core service functions is to:
      store a task to be completed in a scheduling time sheet,
      configure a notification timer using the scheduling time sheet and a preset time, and
      signal the software program module to execute the task at the preset time;
   intelligent service software modules, wherein each intelligent service software module comprises program instructions that when executed perform an intelligent service function that comprises execution of an intelligent engine that is callable by at least two of the intelligent service software modules, each intelligent service software module being callable by the software program module, and when called, is provided with information identifying an intelligent service function to be performed and identifying parameters to be used during the performance of the intelligent service; and
   software programs, wherein each software program comprises a set of program modules that comprises instructions that when executed call at least one of the core service and the intelligent service software modules.

2. The system of claim 1 wherein one of the core service functions is to translate a data format for the data object.

3. The system of claim 1 wherein one of the core service functions is to update the data object stored in an external system.

4. The system of claim 1 wherein one of the core service functions is to route the data object from a first server to a second server using a pre-defined routing rule.

5. The system of claim 1 wherein one of the core service functions is to generate an aggregated data set using a set of data objects and a data conversion algorithm.

6. The system of claim 1 wherein one of the core service functions is to convert a set of data objects to a recognizable format using a data conversion algorithm.

7. The system of claim 1 wherein one of the intelligent service functions is to generate a search index to operate with a search engine.

8. The system of claim 1 wherein one of the intelligent service functions is to generate characteristic features of the data object by executing a clustering algorithm using the data object; and
store the characteristic features in the directory.

9. The system of claim 1 wherein one of the intelligent service functions is to execute a search engine using a query search.

10. The system of claim 1 wherein one of the intelligent service functions is to:
transform the data object into a classification text using the core service modules;
execute a search engine to generate a parse text using the classification text;
execute a text-mining engine to classify the text using the parse text;
determine classification quality using a classification rank from the text-mining engine; and
execute an action based upon the classification quality.

11. The system of claim 1 wherein one of the intelligent service functions is to:
execute a learning engine using a learning algorithm and the set of data;
compare a learning engine output using a previous behavior; and
raise an alert based upon the comparison.

12. The system of claim 1 wherein one of the intelligent service functions is to:
execute a learning engine using a recommendation algorithm;
compare a learning engine output using a predefined performance criteria;
send the learning engine output based on the comparison to the software program module.

13. The system of claim 1 wherein one of the intelligent service functions is to:
execute a prediction model using a prediction request; and
send a prediction result from the prediction model to the software program module.

14. The system of claim 1 wherein one of the intelligent service functions is to:
generate a transformation data set for the content of the data object using core services;
generate an outlier-free transformation data set using an outlier algorithm and the transformation data set;
generate a normalized outlier-free transformation data set using a normalization technique and the outlier-free transformation data set;
generate a set of cross validation data sets from the normalized outlier-free transformation dataset using a random selection algorithm and the normalized outlier-free transformation data set;
execute a knowledge discovery engine using a pattern-recognition algorithm and one of the set of cross validation data sets;
compare a knowledge discovery engine output to a set of control data; and
generate a prediction model based on the comparison.

15. The system of claim 1 wherein one of the intelligent service functions is to:
execute an optimization engine using a decision request;
execute a sensitivity analysis model using an optimization output from the optimization engine; and
send a decision based on a sensitivity analysis from the sensitivity analysis model and the optimization output.

16. The system of claim 1 wherein one of the intelligent service functions is to:
access performance data from the software module;
generate new performance data using the performance data and historical data;
generate data distributions using the new performance data;
execute a planning engine using the data distributions;
compare planning engine output to a goal; and
generate a workflow to propose a goal adjustment based on the comparison.

17. The system of claim 1 wherein one of the intelligent service functions is to:
decompose a goal into a plurality of sub-plans;
bind each sub-plan to a set of software program modules using a hierarchy of software program modules;
generate data distributions using historical data;
execute a planning engine using the data distributions;
compare a planning engine output to a predefined goal; and
generate a plan based on the comparison.

18. The system of claim 1 wherein one of the intelligent service functions is to:
execute an optimization engine using a data binding and an optimization algorithm; and
generate a decision model using a decision boundary and an optimization engine output.

19. The system of claim 1 further comprising:
organization service software modules, wherein each organization service software module comprises program instructions that when executed perform organization service functions that manage at least one software program module, each organization service software module being callable by the software program module, and when called, is provided with information identifying the organization service function to be performed and information identifying the software program module upon which the identified organization service function is to be performed.

20. The system of claim 19 wherein one of the organization service functions is to manage at least one software program module.

21. The system of claim 19 wherein one of the organization service functions is to coordinate execution of a set of program modules.

22. The system of claim 19 wherein one of the organization service functions is to monitor execution of the software program module.

23. The system of claim 19 wherein one of the organization service functions is to:
send requests to a plurality of software program modules to execute a plurality of tasks; and
receive replies to the requests from the plurality of software program modules using a blackboard technique.

24. The system of claim 1 wherein the software programs are agent software programs.

25. An agent software program comprising:
a first program module comprising instructions that when executed perform a call to one of a plurality of core service software modules, wherein each core service software module comprises program instructions that when executed perform core service functions that interact with a data source, each core service software module being callable by a software program module, and when called, is provided with information identifying a core service function to be performed and identifying a data object upon which the identified core service function is to be performed, wherein one of the core service functions is to:
store a task to be completed in a scheduling time sheet, configure a notification timer using the scheduling time sheet and a preset time, and signal the software program module to execute the task at the preset time; and a second program module comprising instructions that when executed perform a call to one of a plurality of intelligent service software modules, wherein each intelligent service software module comprises program instructions that when executed perform an intelligent service function that comprises execution of an intelligent engine that is callable by at least two of the intelligent service software modules, each intelligent service software module being callable by the software program module, and when called, is provided with information identifying an intelligent service function to be performed and identifying parameters to be used during the performance of the intelligent service.

26. The agent software program of claim 25, wherein the plurality of core service functions comprise data transformation, data connection, data routing, data integration, multichannel integration, and a scheduling service.

27. The agent software program of claim 25, wherein the plurality of intelligent service functions comprise a compilation service, a clustering service, a search query service, a classification service, an adaptation service, a recommendation service, a prediction service, a pattern-recognition service, a decision service, a planning service, and an optimization service.

28. The agent software program of claim 25, further comprising instructions that when executed perform a call to one of a plurality of organizational service software modules, wherein each organization service software module comprises program instructions that when executed perform organization service functions that manage the execution of the agent software program in concert with other agent software programs.

29. The agent software program of claim 28, wherein the plurality of organizational service functions comprise a controlling service, a coordination service, a monitoring service, and a collaboration service.

30. The agent software program of claim 25 comprising at least one core service module and at least one intelligent service module arranged as a hierarchy of software modules, the hierarchy of software modules comprising at least one lower layer of software modules and at least one upper layer of software modules.

31. The agent software program of claim 30 wherein the at least one lower layer of software modules provides at least one software module interface to the at least one upper layer of software modules, the at least one software module interface allowing the at least one upper layer of software modules access to the at least one lower layer of software modules.

* * * * *